United States Patent
Yamada et al.

(10) Patent No.: US 7,390,588 B2
(45) Date of Patent: Jun. 24, 2008

(54) FUEL CELL AND PROCESS FOR THE PRODUCTION THEREOF

(75) Inventors: Shuhei Yamada, Chino (JP); Hirotsuna Miura, Fujimi-machi (JP); Yasunori Yamazaki, Shimosuwa-machi (JP); Yoshiharu Ajiki, Fujimi-cho (JP)

(73) Assignee: Seiko Epson Corporation, Tokyo (JP)

( * ) Notice: Subject to any disclaimer, the term of this patent is extended or adjusted under 35 U.S.C. 154(b) by 710 days.

(21) Appl. No.: 10/780,737

(22) Filed: Feb. 19, 2004

(65) Prior Publication Data

US 2004/0209152 A1 Oct. 21, 2004

(30) Foreign Application Priority Data

| Feb. 19, 2003 | (JP) | 2003-041773 |
| Mar. 11, 2003 | (JP) | 2003-065321 |
| Mar. 31, 2003 | (JP) | 2003-095966 |
| Dec. 24, 2003 | (JP) | 2003-427069 |

(51) Int. Cl.
*H01M 8/04* (2006.01)
*H01M 8/10* (2006.01)

(52) U.S. Cl. .................. 429/39; 429/38; 429/44

(58) Field of Classification Search .............. None
See application file for complete search history.

(56) References Cited

U.S. PATENT DOCUMENTS

| 6,376,118 B1* | 4/2002 | Bruck et al. ............ 429/41 |
| 6,387,558 B1* | 5/2002 | Mizuno et al. ........... 429/34 |
| 7,005,205 B1* | 2/2006 | Gyoten et al. ........... 429/34 |
| 2003/0108731 A1* | 6/2003 | Mercuri et al. ........ 428/304.4 |

FOREIGN PATENT DOCUMENTS

JP 2001-113141 4/2001

OTHER PUBLICATIONS

Lee et al, Factorial Design Study of Miniature Fuel Cells with Micromachined Silicon Flow Structures, the 200th Meeting of The Electrochemical Society, Abstract No. 452(2001), no month.
Ching-Chien et al., Planar Interconnection of Multiple Polymer Electrolyte Membrane Fuel Cells by Microfabrication, The 200thMeeting of The Electrochemical Society, Abstract No. 453(2001), no month.

* cited by examiner

*Primary Examiner*—John S Maples
(74) *Attorney, Agent, or Firm*—Oliff & Berridge, PLC

(57) ABSTRACT

A first gas flow path is formed in a first substrate. The first substrate is processed in an ejection device to form a first collector layer, a first gas diffusion layer, a first reactive layer, and an electrolyte membrane. Similarly, the first substrate is processed to form a second reactive layer, a gas diffusion layer, and a second collector layer. A second substrate which has been processed to form a second gas flow path is then disposed on the first substrate to complete production of a fuel cell having a gas flow path formed therein the opening width of which is smaller than the particle diameter of the material constituting the gas diffusion layer.

3 Claims, 30 Drawing Sheets

FIG. 35 A
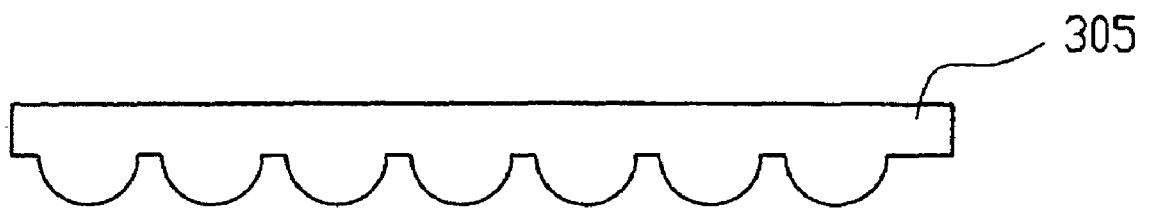
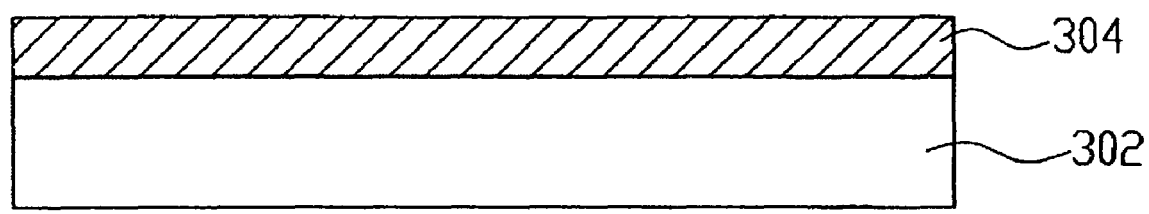
FIG. 35 B
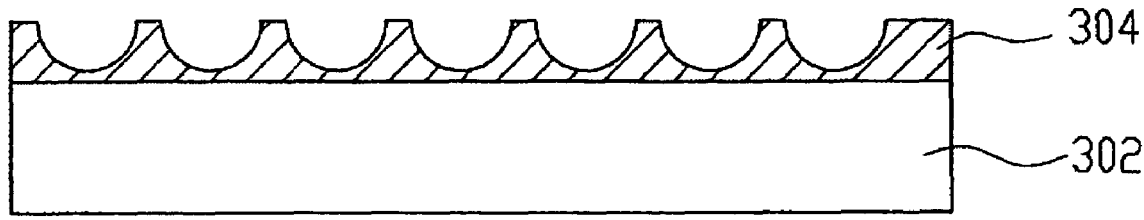

(Prior Art)

FUEL CELL AND PROCESS FOR THE PRODUCTION THEREOF

BACKGROUND OF THE INVENTION

1. Field of Invention

The present invention relates to a fuel cell which undergoes reaction of various kinds of reactive gases supplied into the respective electrodes to generate electricity and a process for the production thereof.

2. Description of Related Art

Heretofore, there have been fuel cells including an ion-permeable electrolyte provided interposed between porous electron-permeable electrodes. Among these fuel cells are those which use hydrogen, natural gas, alcohol or the like as a fuel to generate electricity. Among these fuel cells, the fuel cell which uses, for example, hydrogen as a fuel receives a first reactive gas containing hydrogen in one electrode and a second reactive gas containing oxygen in the other electrode to generate electricity by the reaction of the hydrogen contained in the first reactive gas with the oxygen contained in the second reactive gas.

The substrate of the fuel cell has a gas flow path formed therein for supplying a reactive gas. The reactive gas is supplied through the gas flow path. Accordingly, in order to prevent the material constituting the electrode, such as particulate carbon, from entering in the gas flow path and clogging the space for the flow of the reactive gas, particulate carbon having a greater particle diameter than that of particulate carbon constituting the electrode is disposed in the gas flow path.

A microfuel cell which can be incorporated in cellular phone, and the like is now under research and development. For the production of such a microfuel cell, MEMS (Micro Electro Mechanical System) based on micromachining technology used in semiconductor processing, etc. is used to form a fine gas flow path. Referring to the use of MEMS, a fine gas flow path is formed on the surface of a substrate, such as silicone. An electrically-conductive layer and an electrode made of carbon or the like are then formed on the substrate having a gas flow path formed thereon. A previously formed electrolyte membrane is disposed interposed between two sheets of these substrates having an electrode and other layers formed thereon and then contact-bonded thereto to produce a fuel cell (see, for example, Sang-Joon J Lee, Suk Won Cha, Amy Ching-Chien, O'Hayre and Fritz B. PrinzFactrical, Design Study of Miniature Fuel Cells with Micromachined Silicon Flow Structures, The 200th Meeting of The Electrochemical Society, Abstract No. 452 (2001) and Amy Ching-Chien, Suk Won Cha, Sang-Joon J Lee, O'Hayre and Fritz B. PrinzPlaner, Interconnection of Multiple Polymer Electrolyte Membrane Micro Fabrication, The 200th Meeting of The Electrochemical Society, Abstract No. 453 (2001)).

SUMMARY OF THE INVENTION

In order to dispose particulate carbon in the gas flow path, it is necessary that particulate carbon having a greater particle diameter than that of particulate carbon constituting the electrode be separately prepared, which increases the number of materials required for the production of the fuel cell. Further, a step of disposing the particulate carbon in the gas flow path is that disadvantageously adds to the number of steps required to produce the fuel cell.

Alternatively, a gas flow path the width of which is smaller than the particle diameter of the particulate carbon used as an electrode can be formed using MEMS. However, since most machines for use in semiconductor process are expensive, the use of these machines increases the production cost. In the case where a gas flow path is formed on the substrate using MEMS, it is necessary that a job of contact-bonding an electrolyte membrane to the substrate be separately effected after the formation of the gas flow path in the substrate, which complicates the production procedure.

The pressure of the reactive gas supplied through the gas flow path is high at upstream, but decreases toward downstream. Therefore, the supplied amount of the reactive gas varies from upstream to downstream, causing the deterioration of the electricity-generating efficiency of the fuel cell. In order to accelerate the reaction of the reactive gas, platinum, which is an expensive metal, is used as a catalyst in the reactive layer. However, the reactive layer exhibits a reduced reaction efficiency on the area where the reactive gas is less supplied. Thus, platinum spread over this area doesn't effectively act as a catalyst.

Further, stress developed by the pressure of the reactive gas is applied to the gas flow path, possibly causing the damage of the gas flow path. In other words, a gas flow path having a U-shaped section formed in a substrate 370 shown in FIG. 44 is subject to concentration of stress developed by the pressure of the reactive gas onto the corner P on the bottom thereof. As a result, the wall of the gas flow path shown by the letter L in the drawing can be broken, damaging the gas flow path. Moreover, the gas flow path having a U-shaped section has a great area in contact with the reactive gas, and hence a raised resistance to the reactive gas, causing a great pressure loss of the reactive gas.

Since the production of a microfuel cell using MEMS involves the formation of gas flow path by dry etching or laser machining, a gas flow path having a U-shaped section is formed. This makes it more likely that the resulting stress can cause damage of the gas flow path.

An aim of the invention is to provide a fuel cell having a gas flow path formed therein provided with a space through which a reactive gas flows and a process for the production thereof, a fuel cell having an enhanced efficiency of reaction of reactive gas supplied through a gas flow path and a process for the production thereof and a fuel cell which prevents the damage of gas flow path by stress developed by the pressure of reactive gas and exhibits a reduced flow path resistance and a process for the production thereof.

The fuel cell according to the invention can include a first substrate having a first gas flow path formed therein for supplying a first reactive gas, a first collector layer formed on the first substrate side thereof, a first gas diffusion layer formed on the first substrate side thereof, a first reactive layer formed on the first substrate side thereof, a second substrate having a second gas flow path formed therein for supplying a second reactive gas, a second collector layer formed on the second substrate side thereof, a second gas diffusion layer formed on the second substrate side thereof, a second reactive layer formed on the second substrate side thereof and an electrolyte membrane formed interposed between the first reactive layer and the second reactive layer. The width of the opening of at least one of the first gas flow path and the second gas flow path is smaller than the particle diameter of the material constituting the first gas diffusion layer and the second gas diffusion layer.

In accordance with this fuel cell, at least one of the first gas flow path and the second gas flow path is smaller than the particle diameter of the material constituting the first gas diffusion layer and the second gas diffusion layer. In other words, the opening width of the gas flow path is smaller than the particle diameter of the material constituting the first gas diffusion layer and the second gas diffusion layer, such as porous particulate carbon, which also acts as an electrode. In this arrangement, the entrance of the particulate material into the gas flow path can be prevented to inhibit the clogging of the gas flow path.

The fuel cell according to the invention is also characterized in that the width of the bottom of the first gas flow path is greater than the opening width of the first gas flow path and the width of the bottom of the second gas flow path is greater than the opening width of the second gas flow path. In accordance with this fuel cell, the bottom of the gas flow path is greater than the opening width of the gas flow path, making it possible to supply a sufficient amount of reactive gas even through a gas flow path having a reduced opening width without reducing the flow rate of reactive gas.

The process for the production of a fuel cell according to the invention can include a first gas flow path forming step of forming a first gas flow path in the first substrate for supplying a first reactive gas, a first collector layer forming step of forming a first collector layer, a first gas diffusion layer forming step of forming a first gas diffusion layer, a first reactive layer forming step of forming a first reactive layer, an electrolyte membrane forming step of forming an electrolyte membrane, a second reactive layer forming step of forming a second reactive layer, a second gas diffusion layer forming step of forming a second gas diffusion layer, a second collector layer forming step of forming a second collector layer and a second gas flow path forming step of forming a second gas flow path in the second substrate for supplying a second reactivegas. At least one of the first gas flow path forming step and the second gas flow path forming step comprises forming a gas flow path the opening width of which is smaller than the particle diameter of the material constituting the first gas diffusion layer and the second gas diffusion layer using an ejection device.

In accordance with this process for the production of a fuel cell, at least one of the first gas flow path forming step and the second gas flow path forming step comprises forming a gas flow path the opening width of which is smaller than the particle diameter of the material constituting the first gas diffusion layer and the second gas diffusion layer using an ejection device. In this manner, a fuel cell can be produced which can prevent the entrance of the material constituting the gas diffusion layer, such as porous particulate carbon, which also acts as an electrode into the gas flow path to inhibit the clogging of the gas flow path.

The process for the production of a fuel cell according to the invention is also characterized in that the first gas flow path forming step can include forming a first gas flow path the bottom width of which is greater than the opening width thereof and the second gas flow path forming step includes forming a second gas flow path the bottom width of which is greater than the opening width thereof. In accordance with this process for the production of a fuel cell, the width of the bottom of the gas flow path is greater than the opening width of the gas flow path, making it possible to prevent the clogging of the gas flow path and supply a sufficient amount of reactive gas into the fuel cell.

The fuel cell according to the invention can include a first substrate having a first gas flow path formed therein for supplying a first reactive gas, a first collector layer formed on the first substrate side thereof, a first gas diffusion layer formed on the first substrate side thereof, a first reactive layer formed on the first substrate side thereof, a second substrate having a second gas flow path formed therein for supplying a second reactive gas, a second collector layer formed on the second substrate side thereof, a second gas diffusion layer formed on the second substrate side thereof, a second reactive layer formed on the second substrate side thereof and an electrolyte membrane formed interposed between the first reactive layer and the second reactivelayer. The width of at least one of the first gas flow path and the second gas flow path increases gradually from upstream toward downstream.

In accordance with this fuel cell, the width of at least one of the first gas flow path and the second gas flow path increases gradually from upstream toward downstream. In this arrangement, the amount of reactive gas supplied into the reactive layer through the gas flow path can be kept uniform from upstream to downstream on the gas flow path.

The fuel cell according to the invention is characterized in that the width of at least one of the first gas flow path and the second gas flow path is narrow at its downmost portion. In accordance with this fuel cell, the width of the gas flow path is narrow at its downmost portion, making it possible to properly adjust the pressure of reactive gas in the gas flow path.

The fuel cell according to the invention is also characterized in that any of the first gas flow paths has a feed port at one end of the first substrate and a discharge port at the other and the remaining first gas flow paths have a discharge port at one end of the first substrate and a feed port at the other while any of the second gas flow paths has a feed port at one end of the second substrate and a discharge port at the other and the remaining second gas flow paths have a discharge port at one end of the second substrate and a feed port at the other. In accordance with this fuel cell, any of the gas flow paths formed on the substrate has a feed port at one end of the substrate and a discharge port at the other and the remaining gas flow paths have a discharge port at one end of the substrate and a feed port at the other. In this arrangement, by way of example, a first gas supplying device for supplying a first reactive gas containing oxygen and a second reactive gas supplying device for supplying a second reactive gas containing hydrogen can be properly disposed.

The process for the production of a fuel cell according to the invention also can include a first gas flow path forming step of forming a first gas flow path in the first substrate for supplying a first reactive gas, a first collector layer forming step of forming a first collector layer, a first gas diffusion layer forming step of forming a first gas diffusion layer, a first reactive layer forming step of forming a first reactive layer, an electrolyte membrane forming step of forming an electrolyte membrane, a second reactive layer forming step of forming a second reactive layer, a second gas diffusion layer forming step of forming a second gas diffusion layer, a second collector layer forming step of forming a second collector layer. and a second gas flow path forming step of forming a second gas flow path in the second substrate for supplying a second reactive gas. At least one of the first gas flow path forming step and the second gas flow path forming step includes forming a gas flow path the width of which increases gradually from upstream toward downstream.

In accordance with this process for the production of a fuel cell, at least one of the first gas flow path forming step and the second gas flow path forming step can include forming a gas flow path the width of which increases gradually from upstream toward downstream. In this manner, the amount of reactive gas supplied into the reactive layer through the gas flow path can be kept uniform from upstream to downstream on the gas flow path and a fuel cell having a high electricity generation efficiency can be produced.

The process for the production of a fuel cell according to the invention is also characterized in that at least one of the first gas flow path forming step and the second gas flow path forming step includes forming a gas flow path the width of which is narrow at its downmost portion. In accordance with this process for the production of a fuel cell, a fuel cell can be easily produced having a gas flow path formed therein capable of properly adjusting the pressure of reactive gas therein.

The process for the production of a fuel cell according to the invention is also characterized in that the first gas flow path forming step can include forming first gas flow paths any of which has a feed port at one end of the first substrate and a discharge port at the other and the remaining ones of which have a discharge port at one end of the first substrate and a feed port at the other and the second gas flow path forming step includes forming second gas flow paths any of which has a feed port at one end of the second substrate and a discharge port at the other and the remaining ones of which have a discharge port at one end of the second substrate and a feed port at the other.

In accordance with this process for the production of a fuel cell, any of the gas flow paths formed on the substrate has a feed port at one end of the substrate and a discharge port at the other and the remaining gas flow paths have a discharge port at one end of the substrate and a feed port at the other. In this manner, a fuel cell can be produced which allows proper disposition of a first gas supplying device for supplying a first reactive gas containing oxygen and a second gas supplying device for supplying a second reactive gas containing hydrogen.

The process for the production of a fuel cell according to the invention is also characterized in that at least one of the first gas flow path forming step and the second gas flow path forming step can include forming a gas flow path the width of which increases gradually from upstream toward downstream using an ejection device.

In accordance with this process for the production of a fuel cell, the use of an ejection device makes it easy to form a gas flow path which gradually expands from upstream toward downstream without using MEMS used in the process for the production of semiconductor.

The fuel cell according to the invention can include a first substrate having a first gas flow path formed therein for supplying a first reactive gas, a first collector layer formed on the first substrate side thereof, a first gas diffusion layer formed on the first substrate side thereof, a first reactive layer formed on the first substrate side thereof, a second substrate having a second gas flow path formed therein for supplying a second reactive gas, a second collector layer formed on the second substrate side thereof, a second gas diffusion layer formed on the second substrate side thereof, a second reactive layer formed on the second substrate side thereof and an electrolyte membrane formed interposed between the first reactive layer and the second reactive layer. The width of at least one of the first gas flow path and the second gas flow path gradually decreases from the upper portion toward the bottom of the first or second gas flow path.

In accordance with this fuel cell, the width of at least one of the first gas flow path and the second gas flow path gradually decreases from the upper portion toward the bottom of the first or second gas flow path. In this arrangement, unlike the prior art fuel cell having a gas flow path having a U-shaped section, this fuel cell can properly prevent the concentration of stress developed by the pressure of first or second reactive gas onto a specific site resulting in damage of the gas flow path.

The fuel cell according to the invention is also characterized in that at least one of the first gas flow path and the second gas flow path has a curved section. In accordance with this fuel cell, a gas flow path having a curved section is formed, making it possible to prevent the concentration of stress developed by gas pressure. Further, the resistivity of the gas flow path is reduced by reducing the area of the gas flow path in contact with the first or second reactive gas as compared with the gas flow path having a U-shaped section, making it possible to reduce the loss of gas pressure.

The process for the production of a fuel cell according to the invention can have a first gas flow path forming step of forming a first gas flow path in the first substrate for supplying a first reactive gas, a first collector layer forming step of forming a first collector layer, a first gas diffusion layer forming step of forming a first gas diffusion layer, a first reactive layer forming step of forming a first reactive layer, an electrolyte membrane forming step of forming an electrolyte membrane, a second reactive layer forming step of forming a second reactive layer, a second gas diffusion layer forming step of forming a second gas diffusion layer, a second collector layer forming step of forming a second collector layer and a second gas flow path forming step of forming a second gas flow path in the second substrate for supplying a second reactive gas. At least one of the first gas flow path forming step and the second gas flow path forming step can include forming a gas flow path the width of which gradually decreases from the upper portion toward the bottom of the first or second gas flow path.

In accordance with this process for the production of a fuel cell, at least one of the first gas flow path forming step and the second gas flow path forming step includes forming a gas flow path the width of which gradually decreases from the upper portion toward the bottom of the first or second gas flow path. In this manner, the concentration of stress developed by the pressure of reactive gas onto a specific site in the gas flow path can be prevented to properly inhibit damage of the gas flow path.

The process for the production of a fuel cell according to the invention is characterized in that the first gas flow path forming step can have a gas flow path-forming material spreading step of spreading a gas flow path-forming material over the surface of the first substrate and then forming a first gas flow path the width of which gradually decreases from the upper portion to the bottom of the first gas flow path in the gas flow path-forming material spread over the first substrate using a gas flow path-forming mold for forming a gas flow path and the second gas flow path forming step comprises a gas flow path-forming material spreading step of spreading a gas flow path-forming material over the surface of the second substrate and then forming a second gas flow path the width of which gradually decreases from the upper portion to the bottom of the second gas flow path in the gas flow path-forming material spread over the second substrate using a gas flow path-forming mold for forming a gas flow path.

In accordance with this process for the production of a fuel cell, first and second gas flow paths the width of which gradually decreases from the upper portion toward the bottom thereof are formed using a gas flow path-forming mold in a gas flow path-forming material, such as photo-setting resin. Accordingly, the use of a gas flow path-forming mold makes it possible to form a gas flow path having a desired shape easily and rapidly.

The process for the production of a fuel cell according to the invention is also characterized in that at least one of the first gas flow path forming step and the second gas flow path forming step can include forming a gas flow path having a semicircular section. In accordance with this process for the production of a fuel cell, the gas flow path having a semicircular section has a smaller area in contact with reactive gas than the gas flow path having a U-shaped section, making it possible to properly reduce the loss of pressure of reactive gas.

BRIEF DESCRIPTION OF THE DRAWINGS

The invention will be described with reference to the accompanying drawings, wherein like numerals reference like elements, and wherein:

FIG. 35 is a diagram illustrating the process for the formation of a gas flow path according to the fourth embodiment of implementation of the invention;

DETAILED DESCRIPTION OF PREFERRED EMBODIMENTS

Figure 1:
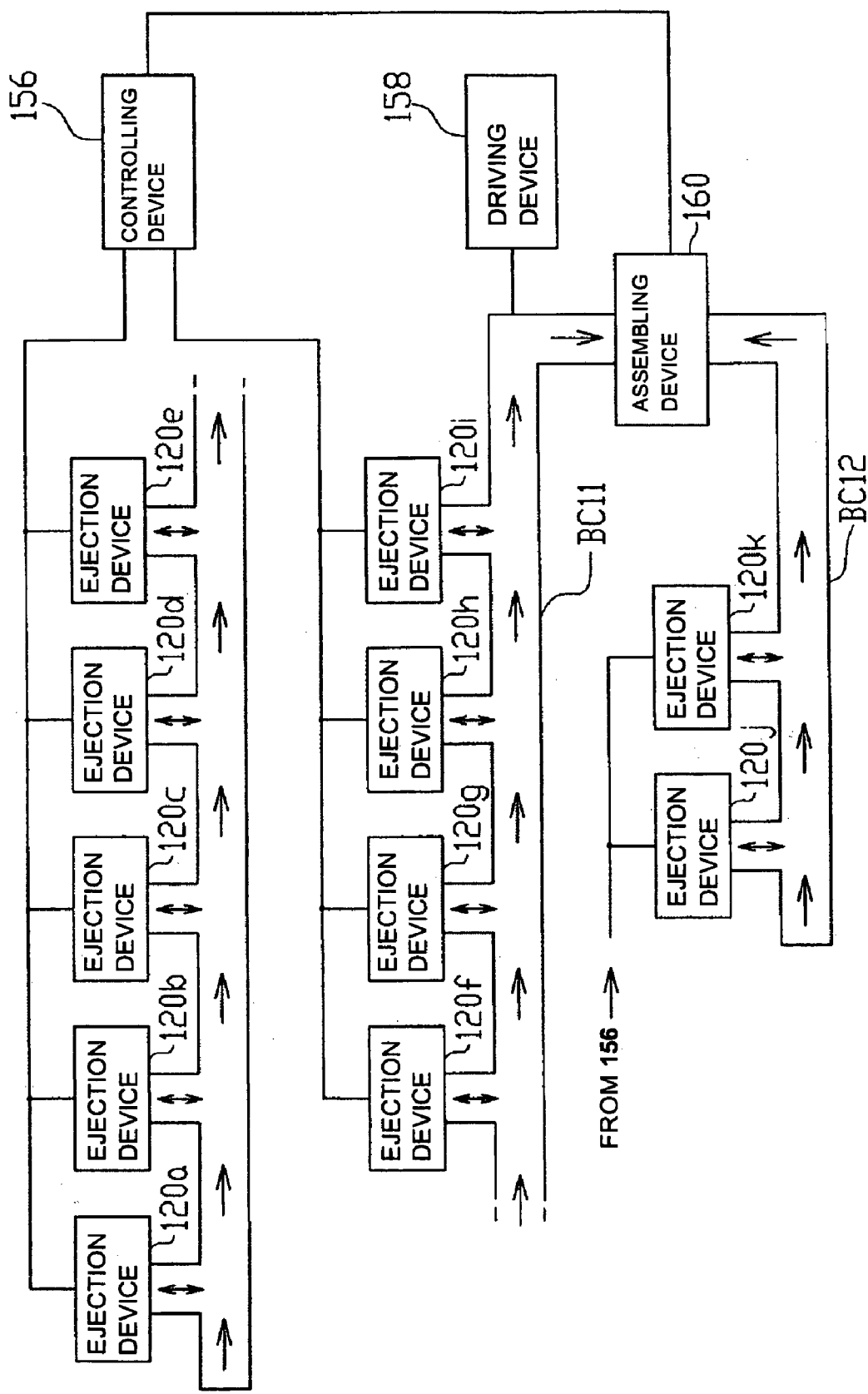
FIG. 1 is a diagram illustrating a fuel cell production line according to a first embodiment of implementation of the invention.

Processes for the production of a fuel cell according to embodiments of implementation of the invention will be described hereinafter. FIG. 1 is a diagram illustrating the configuration of an exemplary fuel cell production line for executing the process for the production of a fuel cell according to a first embodiment of implementation of the invention. As shown in FIG. 1, the fuel cell production line is formed by ejection devices 120a to 120k used in various steps, a belt conveyor BCl 1 connecting the ejection devices 120a to 120i to each other, a belt conveyor BC12 connecting the ejection devices 120j and 120k to each other, a driving device 158 for driving the belt conveyors BC 11 and BC 12, an assembling device 160 for assembling a fuel cell and a controlling device 156 for controlling the entire fuel cell production line.

The ejection devices 120a to 120i are arranged at a predetermined interval in a line along the belt conveyor BC11. The ejection devices 120j and 120k are arranged at a predetermined distance in a line along the belt conveyor BC12. The controlling device 156 is connected to the ejection devices 120a to 120k, the driving device 158 and the assembling device 160. The belt conveyor BC11 is driven according to control signal from the controlling device 156 to convey the substrate of fuel cell (hereinafter, simply referred to as "substrate") onto the ejection devices 120a to 120i where it is then processed. Similarly, the belt conveyor BC12 is driven according to control signal from the controlling device 156 to convey the substrate onto the ejection devices 120j and 120k where it is then processed. At the assembling device 160, the substrates which have been conveyed by the belt conveyors BC11 and BC12 are assembled into a fuel cell according to the control signal from the controlling device 156.

In accordance with this fuel cell production line, a resist solution for forming a gas flow path is spread over the substrate at the ejection device 120a. At the ejection device 120b, the substrate is subjected to etching for forming a gas flow path. At the ejection device 120c, the substrate is processed for the formation of a collector layer. At the ejection device 120d, the substrate is processed for the formation of a gas diffusion layer. At the ejection device 120e, the substrate is processed for the formation of a reactive layer. At the ejection device 120f, the substrate is processed for the formation of an electrolyte membrane. Further, at the ejection device 120g, the substrate is processed for the formation of a reactive layer. At the ejection device 120h, the substrate is processed for the formation of a gas diffusion layer. At the ejection device 120i, the substrate is processed for the formation of a collector layer.

Further, at the ejection device 120j, a resist solution for forming a gas flow path is spread over the substrate. At the ejection device 120k, the substrate is subjected to etching for the formation of a gas flow path. In the case where the first substrate is processed at the ejection devices 120a to 120i, the second substrate is processed at the ejection devices 120j and 120k for the formation of a gas flow path.

Figure 2:
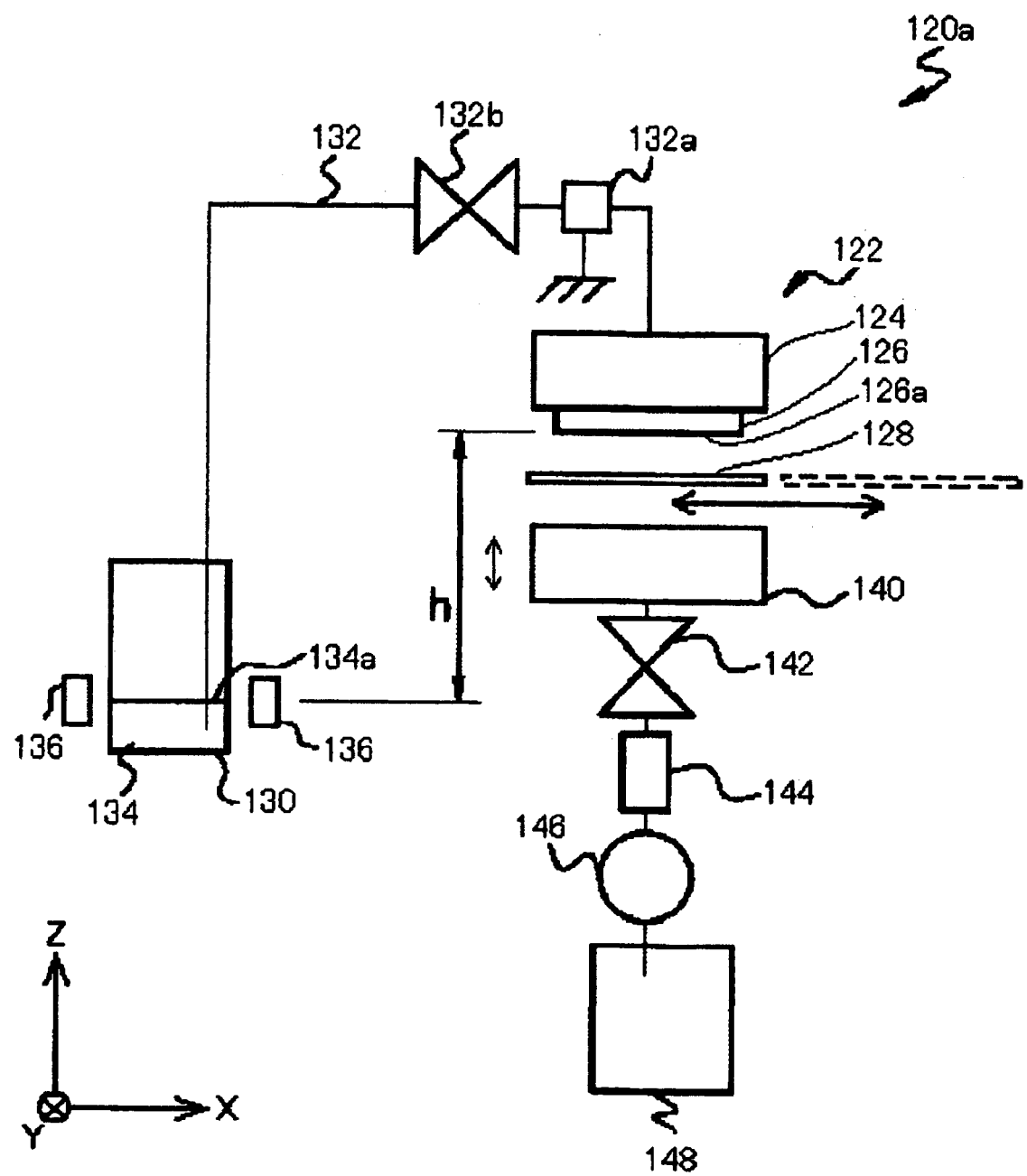
FIG. 2 is a schematic diagram of an ink jet type ejection device according to the first embodiment of implementation of the invention.

FIG. 2 is a diagram illustrating the outline of the configuration of an ink jet type ejection device 120a for use in the production of a fuel cell according to the first embodiment of implementation of the invention. The ejection device 120a can include an ink jet head 122 for ejecting an object onto the substrate. The ink jet head 122 can include a head main body 124 and a nozzle forming surface 126 having a number of nozzles for ejecting an object formed thereon. From the nozzles on the nozzle forming surface 126, an object, i.e., resist solution to be spread over the substrate during the formation of a gas flow path for the supply of reactive gas on the substrate is ejected. The ejection device 120a includes a table 128 on which the substrate rests. The table 128 is provided in such an arrangement that it can move in predetermined directions such as X axis direction, Y axis direction and Z axis direction. When the table 128 moves in the direction along X axis as shown by the arrow, it receives on the table 128 the substrate which has been conveyed by the belt conveyor BC11 and then takes the substrate into the ejection device 120a.

To the ink jet head 122 is connected to a tank 130 for receiving a resist solution as an object to be ejected from the nozzles formed on the nozzle forming surface 126. In other words, the tank 130 and the ink jet head 122 are connected to each other via an ejection object conveying pipe 132 for conveying an object to be ejected. The ejection object conveying pipe 132 comprises an ejection object flow path grounding fitting 132a for preventing the electrification of the interior of the ejection object conveying pipe 132 and a head bubble ejection valve 132b. The head bubble ejection valve 132b is used to suck the object off the interior of the ink jet head 122 through a suction cap 140 described later. In other words, in order to suck the object off the interior of the ink jet head 122 through the suction cap 140, the head bubble ejection valve 132b is closed to prevent the entrance of the object from the tank 130. The use of the suction cap 140 causes the object to be sucked off at a raised rate, making it possible to readily eject bubbles from the interior of the ink jet head 122.

The ejection device 120a can include a liquid level controlling sensor 136 for controlling amount of the ejection object received in the tank 130, i.e., the level of the surface 134a of the resist solution received in the tank 130. The liquid level controlling sensor 136 controls to keep the difference h between the level of the forward end 126a of the nozzle forming surface 126 provided in the ink jet head 122 and the surface 134a of the solution in the tank 130 (hereinafter referred to as "head value") within a predetermined range. By properly controlling the level of the surface 134a, the ejection object 134 in the tank 130 can be fed into the ink jet head 122 at a pressure falling within a predetermined range. By thus feeding the ejection object 134 at a pressure falling within a predetermined range, the ejection object 134 can be stably ejected from the ink jet head 122.

A suction cap 140 for sucking the ejection object off the interior of the nozzles in the ink jet head is disposed opposed to the nozzle forming surface 126 of the ink jet head 122 at a predetermined distance. The suction cap 140 is arranged, such that it can move in the direction along Z axis shown by the arrow in FIG. 2. The suction cap 140 is also arranged to come in close contact with the nozzle forming surface 126 so as to surround the plurality of nozzles formed on the nozzle forming surface 126 and form a sealed space with the nozzle forming surface 126 that can keep the nozzles from the atmosphere. The suction of the ejection object off the interior of the nozzles in the ink jet head 122 by the suction cap 140 is conducted when the ink jet head 122 does not eject the ejection object 134, e.g., the ink jet head 122 is in shunting position or the like and the table 128 shunts in the position shown by the broken line.

Provided under the suction cap 140 is a flow path in which a suction valve 142, a suction pressure detecting sensor 144 for detecting abnormality in suction and a suction pump 146 having a tube pump or the like are provided. The ejection object 134 which has been sucked by the suction pump 146 or the like and conveyed through the flow path is then received by a waste liquid tank 148.

The configuration of the ejection devices 120b to 120k is the same as that of the ejection device 120a and its description is omitted. However, in the following description, the constituents of the ejection devices 120b to 120k will be described with the same numerals as those of the ejection device 120a. The tank 130 provided in each of the ejection devices 120b to 120k receives an ejection object necessary for predetermined processing to be executed in the ejection devices 120b to 120k. For example, the tanks 130 provided in the ejection devices 120b and 120k each receive an ejection object for etching to be effected during the formation of gas flow path and the tanks 130 provided in the ejection devices 120c and 120i each receive an ejection object for forming a collector layer. Further, the tanks 130 provided in the ejection devices 120d and 120h each receive an ejection object for forming a gas diffusion layer, the tanks 130 provided in the ejection devices 120e and 120g each receive an ejection object for forming a reactive layer, and the tank 130 provided in the ejection device 120f receives an ejection object for forming an electrolyte membrane. Moreover, the tank 130 provided in the ejection device 120j receives the same ejection object as that received in the tank 130 of the ejection device 120a for forming a gas flow path in the substrate.

A process for the production of a fuel cell using the ejection devices 120a to 120k according to the first embodiment of implementation of the invention will be described in connection with the flow chart shown in FIG. 3 and the attached drawings.

Figure 4:
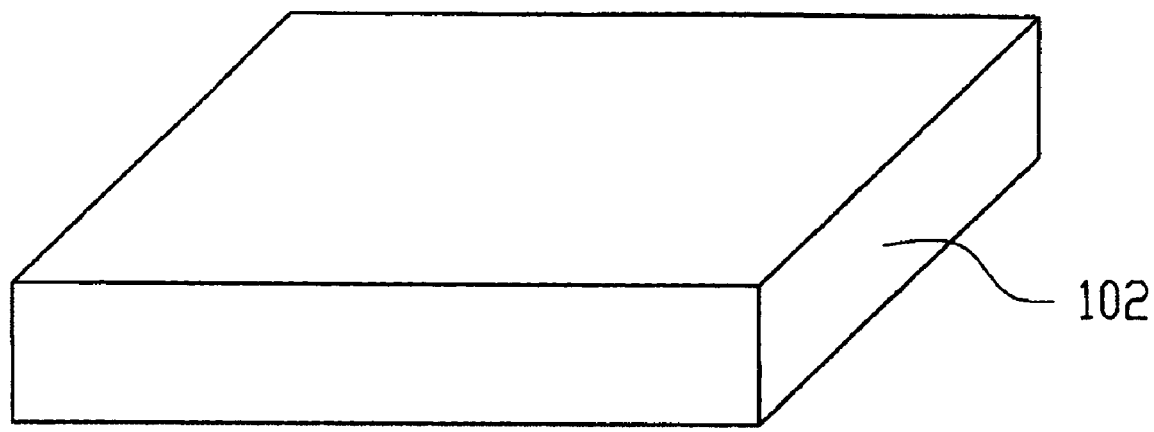
FIG. 4 is a diagram illustrating a process for the formation of a gas flow path according to the first embodiment of implementation of the invention.
Figure 4:
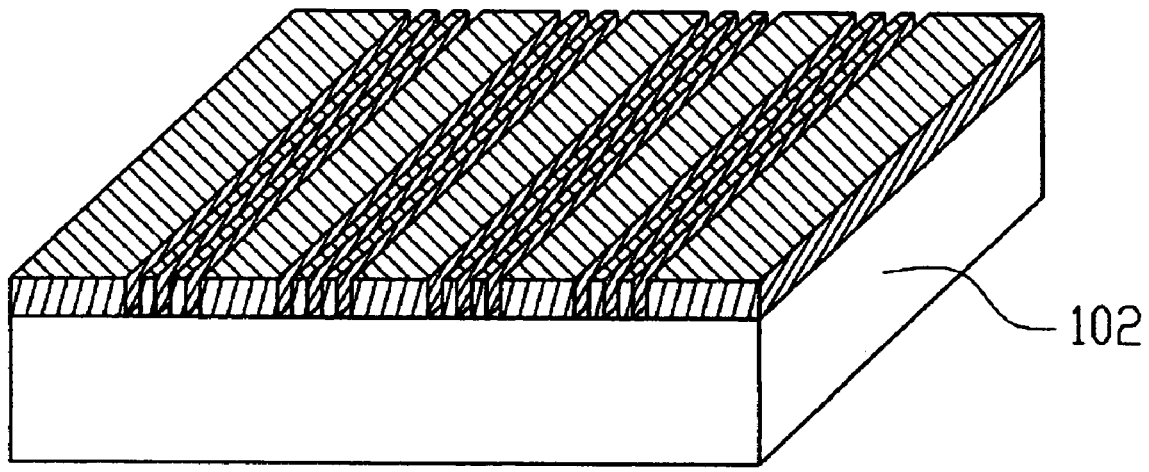

Firstly, a gas flow path for supplying reactive gas is formed in the substrate (Step S11). First, a rectangular flat substrate made of silicon 102 (first substrate) as shown in FIG. 4(a) is conveyed to the ejection device 120a by the belt conveyor BC 11. The substrate 102 which has been conveyed by the belt conveyor BC11 is placed on the table 128 of the ejection device 120a and then taken into the ejection device 120a. In the ejection device 120a, the resist solution received in the tank 130 is ejected through the nozzles on the nozzle forming surface 126 and spread over predetermined positions of the substrate 102 which is rested on the table 128. During this procedure, the resist solution is linearly spread over the substrate 102 at a predetermined interval from front to rear as viewed on FIG. 4(b). That is, the resist solution is spread over the substrate 102 at area except the area where a gas flow path for supplying first reactive gas containing, e.g., hydrogen (first gas flow path) is formed.

During this procedure, the resist solution is spread over the substrate 102 at an interval smaller than the particle diameter of the material constituting the gas diffusion layer, e.g., porous particulate carbon. That is, the resist solution is spread over the substrate 102 in such a manner that the opening width of the gas flow path thus formed becomes smaller than the particle diameter of carbon constituting the gas diffusion layer.

Subsequently, the substrate 102 over which the resist solution has been spread at predetermined positions (see FIG. 4(b)) is conveyed by the belt conveyor BC11 to the ejection device 120b where it is placed on the table 128 of the ejection device 120b and then taken into the ejection device 120b. In the ejection device 120b, a solution received in the tank 130 for etching to be effected to form a gas flow path, e.g., aqueous solution of hydrofluoric acid is ejected through the nozzles on the nozzle forming surface 126 and spread over the whole of the upper surface of the substrate 102 placed on the table 128.

Figure 5A:
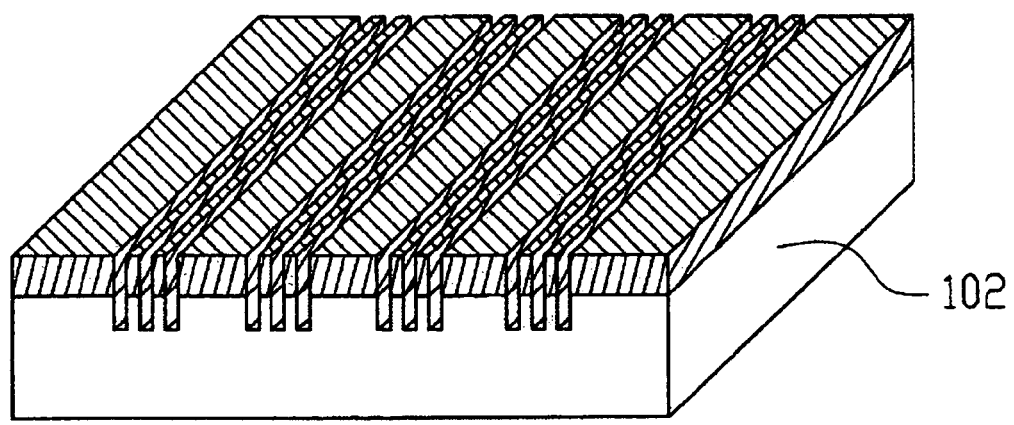
FIG. 5 is another diagram illustrating a process for the formation of a gas flow path according to the first embodiment of implementation of the invention.
Figure 5B:
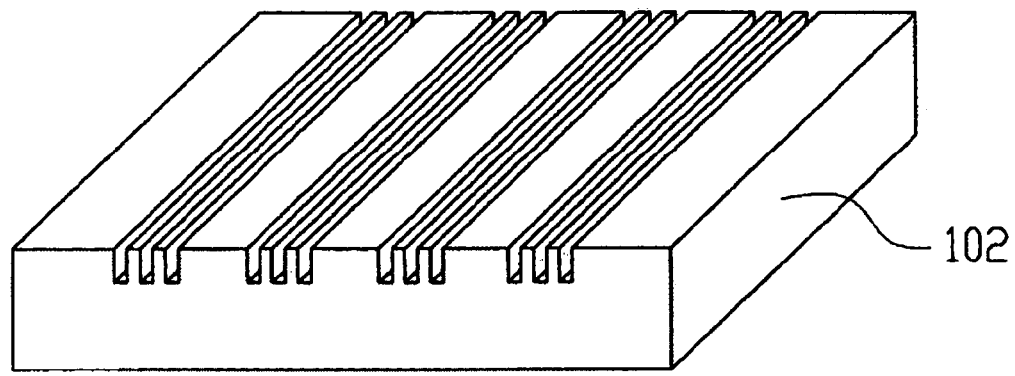

During this procedure, since the substrate 102 has the resist solution spread except at the area where a gas flow path is formed, the substrate 102 is etched with the aqueous solution of hydrofluoric acid, at the area free of the resist solution, to form a gas flow path as shown in FIG. 5(a). That is, a gas flow path having a U-shaped section and an opening width smaller than the particle diameter of particulate carbon constituting the gas diffusion layer and extending from one side to the other side of the substrate 102 is formed. The substrate 102 which thus has a gas flow path formed therein as shown in FIG. 5(a) is cleaned in a cleaning device (not shown) to remove the resist (see FIG. 5(b)). The substrate 102 which thus has a gas flow path formed therein is transferred from the table 128 to the belt conveyor BC11 by which it is then conveyed to the ejection device 120c.

Subsequently, a collector layer (first collector layer) for collecting electrons generated by the reaction of the reactive gas is formed on the substrate 102 (Step S11). That is, the substrate 102 which has been conveyed to the ejection device 120c by the belt conveyor BC11 is placed on the table 128 which then taken into the ejection device 120c. In the ejection device 120c, the material received in the tank 130 for forming a collector layer 106, e.g., electrically-conductive material, such as copper, is ejected onto the substrate 102 placed on the table 128 through the nozzles on the nozzle forming surface 126. During this procedure, the electrically-conductive material is ejected in a pattern such that the diffusion of reactive gas supplied into the gas flow path cannot be prevented, e.g., in a mesh pattern, to form the collector layer 106.

Figure 6:
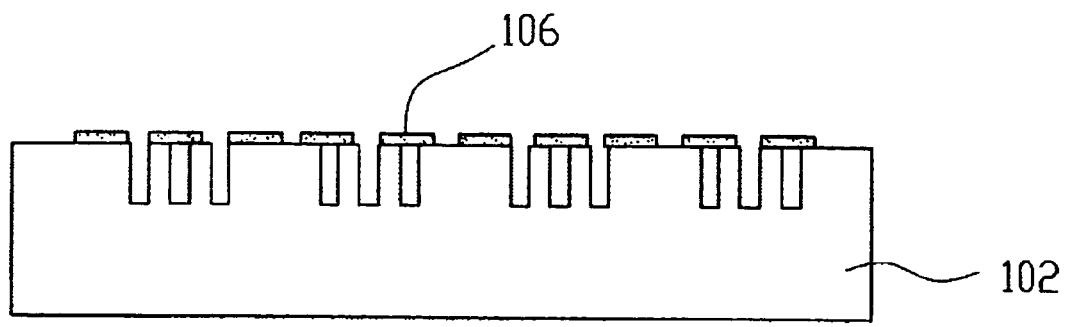
FIG. 6 is an end view of a substrate processed at a process for the production of a fuel cell according to the first embodiment of implementation of the invention.

FIG. 6 is an end view of the substrate 102 having the collector layer 106 formed thereon. As shown in FIG. 6, when the electrically-conductive material, such as copper, is ejected in a mesh pattern, the collector layer 106 is formed. The substrate 102 having the collector layer 106 formed thereon is transferred from the table 128 to the belt conveyor BC11 by which it is then conveyed to the ejection device 120d.

Subsequently, a gas diffusion layer (first gas diffusion layer) for diffusing the reactive gas supplied through the gas flow path formed on the substrate 102 is formed on the collector layer 106 formed at Step S11 (Step S12). That is, the substrate 102 which has been conveyed to the ejection device 120d by the belt conveyor BC11 is placed on the table 128 which is then taken into the ejection device 120d. In the ejection device 120d, the material received in the tank 130 for forming the gas diffusion layer 108, e.g., particulate carbon is ejected onto the collector layer 106 through the nozzles on the nozzle forming surface 126 to form the gas diffusion layer 108 for diffusing the reactive gas (first reactive gas) supplied through the gas flow path.

Figure 7:
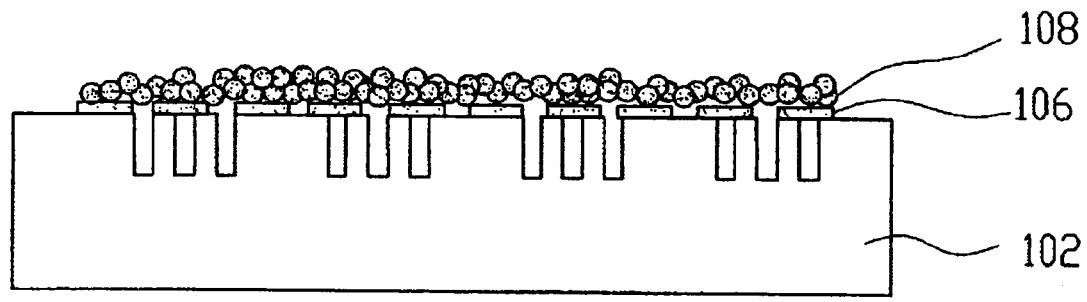
FIG. 7 is an end view of a substrate processed at a process for the production of a fuel cell according to the first embodiment of implementation of the invention.

FIG. 7 is an end view of the substrate 102 having the gas diffusion layer 108 formed thereon. As shown in FIG. 7, particulate carbon which also acts as an electrode is ejected onto the collector layer 106 to form a gas diffusion layer 108 for diffusing the reactive gas. As the particulate carbon constituting the gas diffusion layer 108, there is used a porous particulate carbon having a size such that the reactive gas supplied through the gas flow path can be sufficiently diffused. For example, a porous particulate carbon having a diameter of about 0.1 to 1 μm may be used. When the opening width of the gas flow path is less than 1 μm, a particulate carbon having a diameter of 1 μm or more is used as the particulate carbon constituting the gas diffusion layer. The substrate 102 having the gas diffusion layer 108 formed thereon is transferred from the table 128 onto the belt conveyor BC11 by which it is then conveyed to the ejection device 120e.

Subsequently, a reactive layer (first reactive layer) for reacting the reactive gas supplied through the gas flow path formed on the substrate 102 is formed on the gas diffusion layer 108 formed at Step S12 (Step S13). That is, the substrate 102 which has been conveyed to the ejection device 120e by the belt conveyor BC11 is placed on the table 128 which is then taken into the ejection device 120e. In the ejection device 120e, the material received in the tank 130 for forming the reactive layer, e.g., particulate carbon having particulate platinum of a particle diameter of few nanometers to several tens of nanometers supported thereon as catalyst (carbon-supported platinum) is ejected onto the gas diffusion layer 108 to form a reactive layer 110. As the carbon supporting the particulate platinum, there can be used the same particulate carbon as that constituting the gas diffusion layer 108, i.e., porous particulate carbon having the same particle diameter as that of the particulate carbon constituting the gas diffusion layer 108. A dispersion of particulate platinum in a solvent with a dispersant may be spread over the gas diffusion layer 108 the substrate 102 of which is then heated to 200° C. in a nitrogen atmosphere so that the dispersant is removed to form the reactive layer 110. In this case, particulate platinum is attached to the surface of the particulate carbon constituting the gas diffusion layer 108 as a catalyst to form a reactive layer 110.

Figure 8:
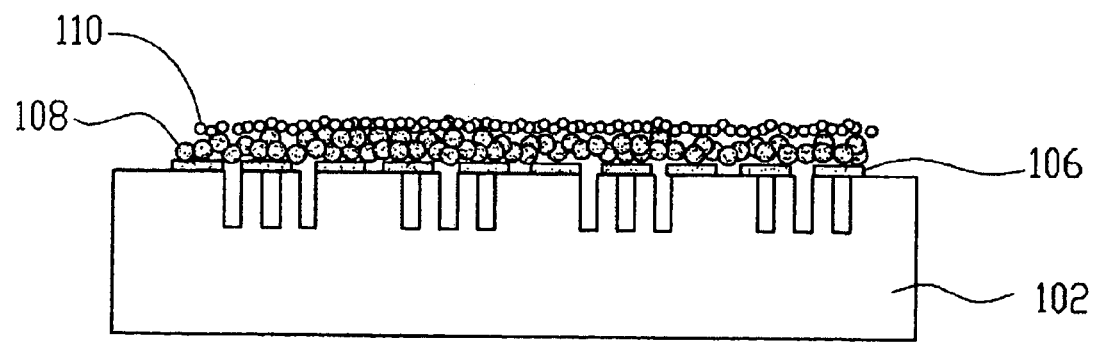
FIG. 8 is an end view of a substrate processed at a process for the production of a fuel cell according to the first embodiment of implementation of the invention.

FIG. 8 is an end view of the substrate 102 having the reactive layer 110 formed thereon. As shown in FIG. 8, carbon having particulate platinum supported thereon as a catalyst is spread over the gas diffusion layer 108 to form the reactive layer 110. In FIG. 8, only the particulate platinum is shown as the reactive layer 110 so that the reactive layer 110 and the gas diffusion layer 108 can be easily distinguished from each other. In the following drawings, the reactive layer is shown similarly to FIG. 8. The substrate 102 having the reactive layer 110 formed thereon is transferred from the table 128 to the belt conveyor BC11 by which it is then conveyed to the ejection device 120f.

Subsequently, an electrolyte membrane, such as an ion exchange membrane, is formed on the reactive layer 110 formed at Step S13 (Step S14). That is, first, the substrate 102 which has been conveyed to the ejection device 120f by the belt conveyor BC11 is placed on the table 128 which is then taken into the ejection device 120f. In the ejection device 120f, the material received in the tank 130 for forming an electrolyte membrane, e.g., ceramics-based solid electrolyte, such as tungstophosphoric acid and molybdophosphoric acid, the viscosity of which has been adjusted to a predetermined value, is ejected onto the reactive layer 110 through the nozzles on the nozzle forming surface 126 to form an electrolyte membrane 12.

Figure 9:
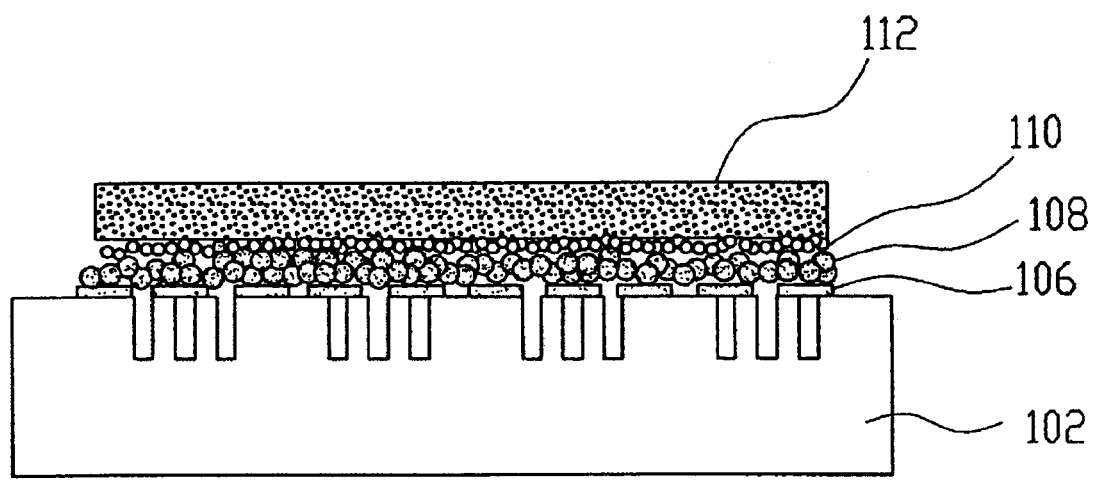
FIG. 9 is an end view of a substrate processed at a process for the production of a fuel cell according to the first embodiment of implementation of the invention.

FIG. 9 is an end view of the substrate 102 having the electrolyte membrane 112 formed thereon. As shown in FIG. 9, the electrolyte membrane 112 having a predetermined thickness is formed on the reactive layer 110. The substrate 102 having the electrolyte membrane 112 formed thereon is transferred from the table 128 to the belt conveyor BC11 by which it is then conveyed to the ejection device 120g.

Subsequently, a reactive layer (second reactive layer) is formed on the electrolyte membrane 112 formed at Step S14 (Step S15). That is, the substrate 102 which has been conveyed to the ejection device 120g by the belt conveyor BC11 is placed on the table 128 which is then taken into the ejection device 120g. In the ejection device 120g, carbon having particulate platinum supported thereon is ejected onto the substrate 102 in the same manner as in the ejection device 120e to form a reactive layer 110'.

Figure 10:
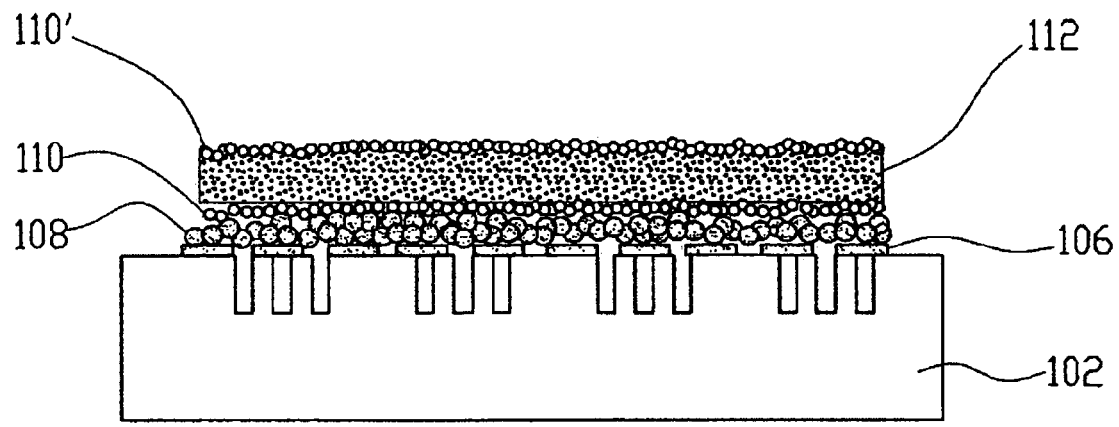
FIG. 10 is an end view of a substrate processed at a process for the production of a fuel cell according to the first embodiment of implementation of the invention.

FIG. 10 is an end view of the substrate 102 having the reactive layer 110' formed on the electrolyte membrane 112. As shown in FIG. 10, carbon having particulate platinum supported thereon as a catalyst is spread over the electrolyte membrane 112 to form the reactive layer 110'. The reactive layer 110' is a layer which reacts on the basis of a second reactive gas, e.g., a reactive gas containing oxygen.

Subsequently, a gas diffusion layer (second gas diffusion layer) for diffusing the reactive gas (second reactive gas) is formed on the reactive layer 110' formed at Step S15 (Step S16). That is, the substrate 102 having the reactive layer 110' formed thereon is conveyed by the belt conveyor BC11 to the ejection device 120h where it is then coated with a porous particulate carbon having a predetermined particle diameter in the same manner as in the ejection device 120d to form a gas diffusion layer 108'.

Figure 11:
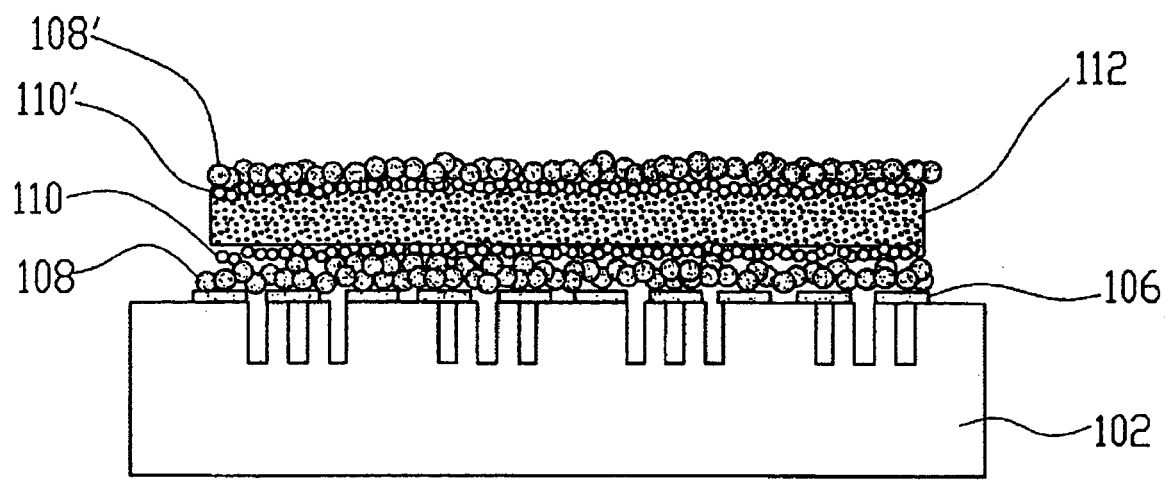
FIG. 11 is an end view of a substrate processed at a process for the production of a fuel cell according to the first embodiment of implementation of the invention.

FIG. 11 is an end view of the substrate 102 having the gas diffusion layer 108' formed on the reactive layer 110'. As shown in FIG. 11, a porous particulate carbon is spread over the reactive layer 110' to form the gas diffusion layer 108'.

Subsequently, a collector layer (second collector layer) is formed on the gas diffusion layer 108' formed at Step S16 (Step S17). That is, the substrate 102 which has been conveyed to the ejection device 120i by the belt conveyor BC11 is placed on the table 128 which is then taken into the ejection device 120i where it is then processed in the same manner as in the ejection device 120C to form a collector layer 106' on the gas diffusion layer 108'.

Figure 12:
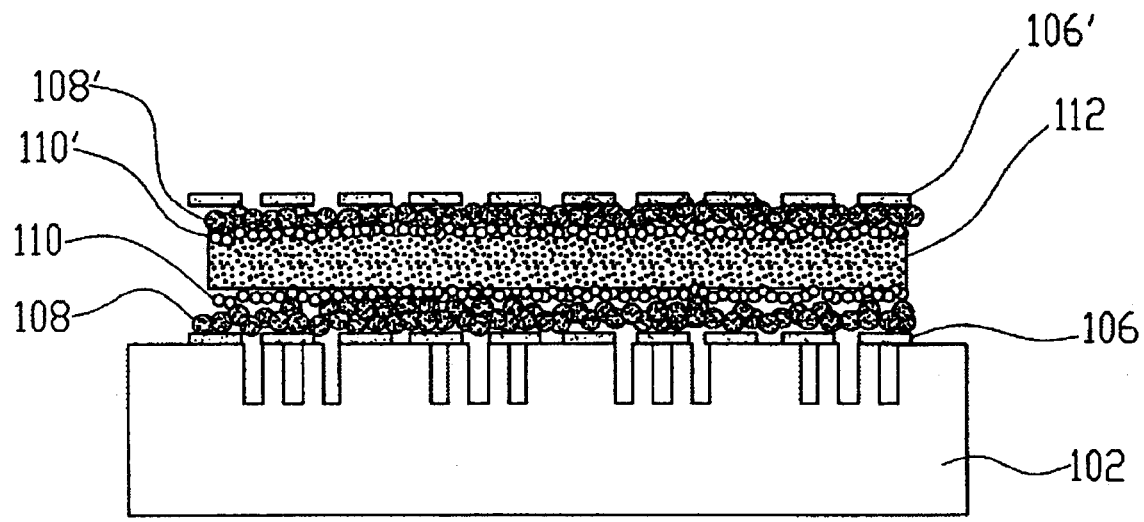
FIG. 12 is an end view of a substrate processed at a process for the production of a fuel cell according to the first embodiment of implementation of the invention.

FIG. 12 is an end view of the substrate 102 having the collector layer 106' formed on the gas diffusion layer 108'. As shown in FIG. 12, the substrate 102 is processed according to Step S17 as mentioned above to form the collector layer 106'. The substrate 102 having the collector layer 106' formed thereon is transferred from the table 128 to the belt conveyor BC11 by which it is then conveyed to the assembling device 160.

Subsequently, a substrate having the gas flow path formed therein (second substrate) is provided on the substrate (first substrate) on which the collector layer has been formed at Step S17 to assemble a fuel cell (Step S118). That is, in the assembling device 160, the substrate 102' (second substrate) which has been conveyed by the belt conveyor BC12 is disposed on the substrate 102 (first substrate) which has been conveyed by the belt conveyor BC11 to assemble a fuel cell. Here, the substrate 102' has a second gas flow path formed therein, apart from the processing at Steps S10 to S17 mentioned above. In other words, in the ejection devices 120j and 120k, a second gas flow path is formed in the same manner as in the ejection devices 120a and 120b. Accordingly, the substrate 102' is disposed on the substrate 102 in such an arrangement that the gas flow path having a U-shaped section extending from one side to the other side of the substrate 102 is parallel to the gas flow path having a U-shaped section formed on the substrate 102' to assemble a fuel cell. Thus, the production of a fuel cell is completed.

Figure 13:
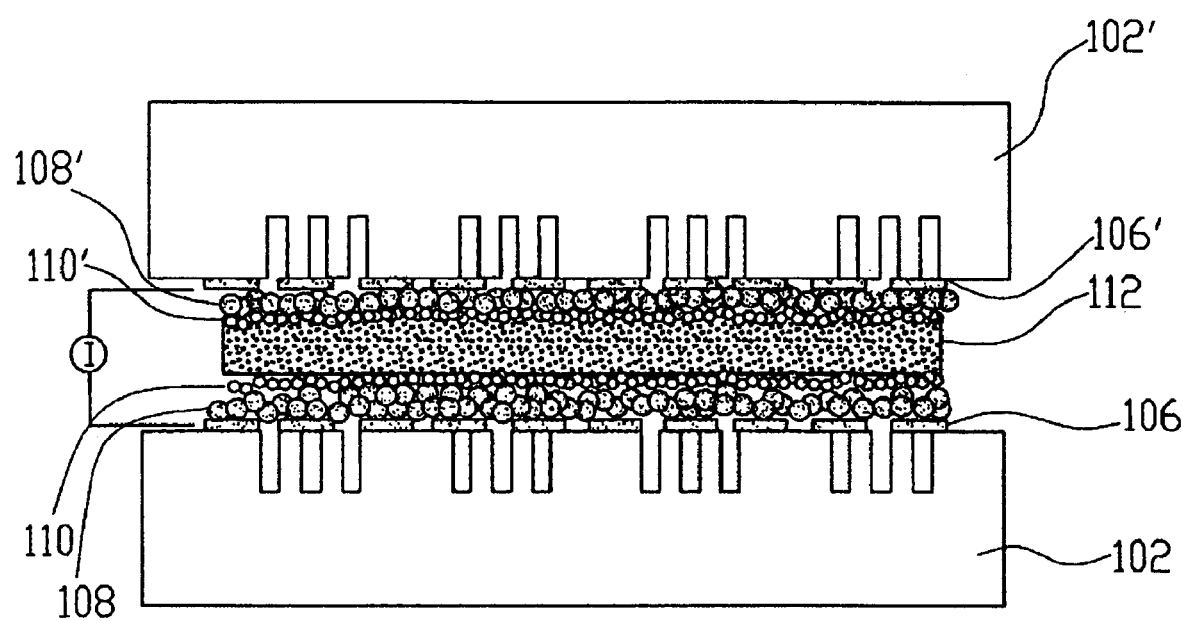
FIG. 13 is an end view of a fuel cell according to the first embodiment of implementation of the invention.

FIG. 13 is an end view of the fuel cell thus completed. As shown in FIG. 13, the substrate 102' having the second gas flow path formed therein is disposed on the substrate 102 at a predetermined position to complete the production of a fuel cell which supplies the first reactive gas and the second reactive gas through the first gas flow path and the second gas flow path formed on the first substrate and the second substrate, respectively.

In accordance with the fuel cell according to the first embodiment of implementation of the invention, the opening width of the gas flow path in the fuel cell is smaller than the particle diameter of particulate carbon used in the formation of the gas diffusion layer. Accordingly, a space for supplying reactive gas can be secured in the gas flow path without separately providing particulate carbon having a great particle diameter.

Further, in accordance with the process for the production of a fuel cell according to the first embodiment of implementation of the invention, a gas flow path is formed on the substrate using an ink jet type ejection device to produce a fuel cell. As a result, a gas flow path the opening width of which is smaller than the particle diameter of particulate carbon can be easily formed using an ink jet type ejection device. Therefore, a gas flow path having a small opening width can be formed without using any expensive semiconductor processing machines, such as MEMS, making it possible to reduce the production cost of fuel cell.

Moreover, in accordance with the process for the production of a fuel cell according to the first embodiment of implementation of the invention, it is not necessary that large particulate carbon having a particle diameter different from that of particulate carbon used in the formation of the gas diffusion layer be separately provided. This can not only reduce the number of materials to be used in the production of the fuel cell but also eliminate extra working steps, making it possible to efficiently produce the fuel cell.

Figure 14:
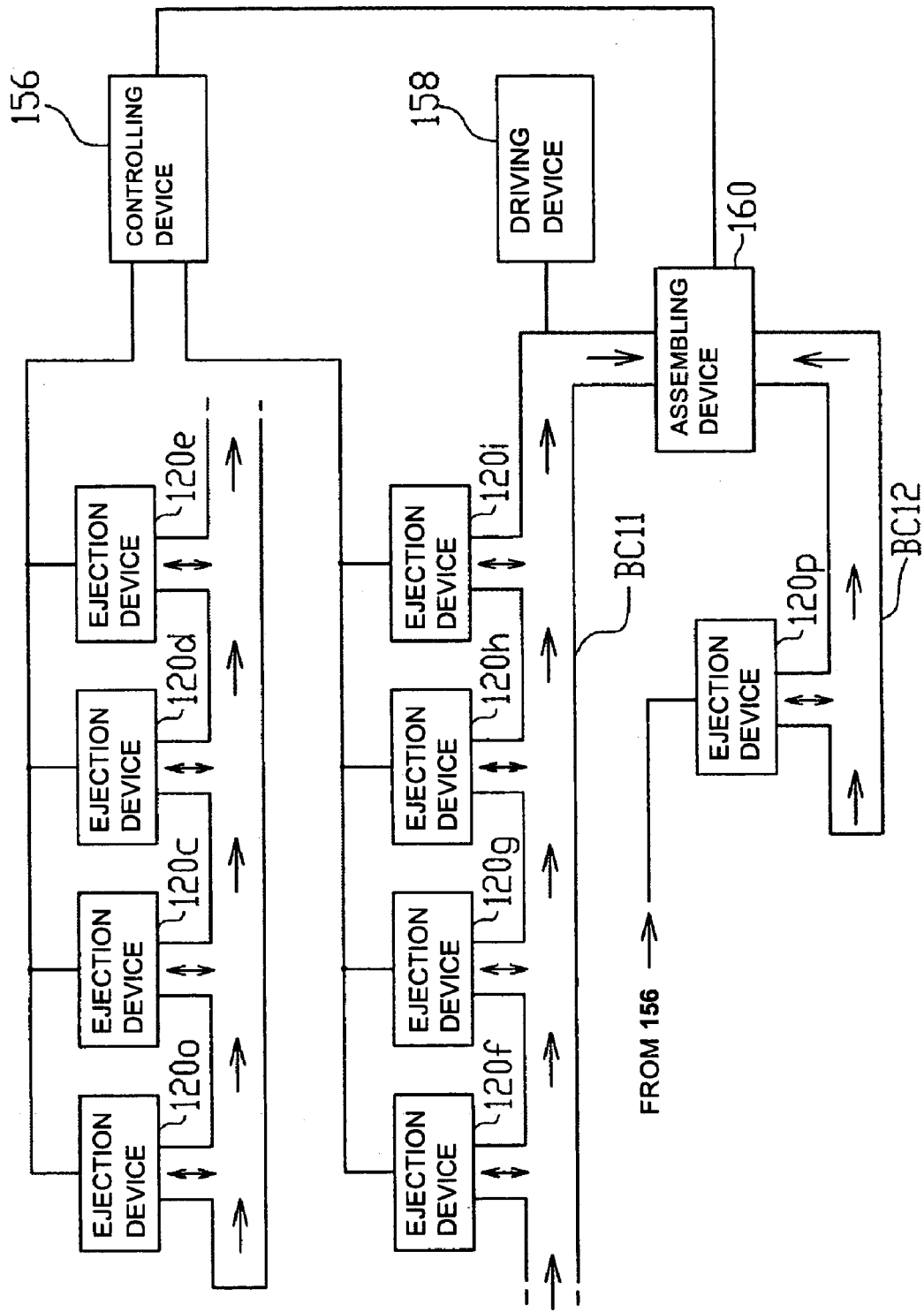
FIG. 14 is a diagram illustrating a fuel cell production line according to a second embodiment of implementation of the invention.

A process for the production of a fuel cell according to the second embodiment of implementation of the invention will be described hereinafter. In the description of the second embodiment of implementation of the invention, the same configuration as that of the first embodiment of implementation of the invention will be described with the same numeral as used in the first embodiment of implementation of the invention. FIG. 14 is a diagram illustrating the fuel cell production line according to the second embodiment of implementation of the invention. As shown in FIG. 14, in the fuel cell production line according to the second embodiment of implementation of the invention, the processing to be conducted in the ejection devices 120*a* and 120*b* of the first embodiment of implementation of the invention are conducted in the ejection device 120*o* and the processing to be conducted in the ejection devices 120*j* and 120*k* of the first embodiment of implementation of the invention are conducted in the ejection device 120*p*. The other configurations are the same as that of the fuel cell production line according to the first embodiment of implementation of the invention and thus will not be described in detail.

Figure 15:
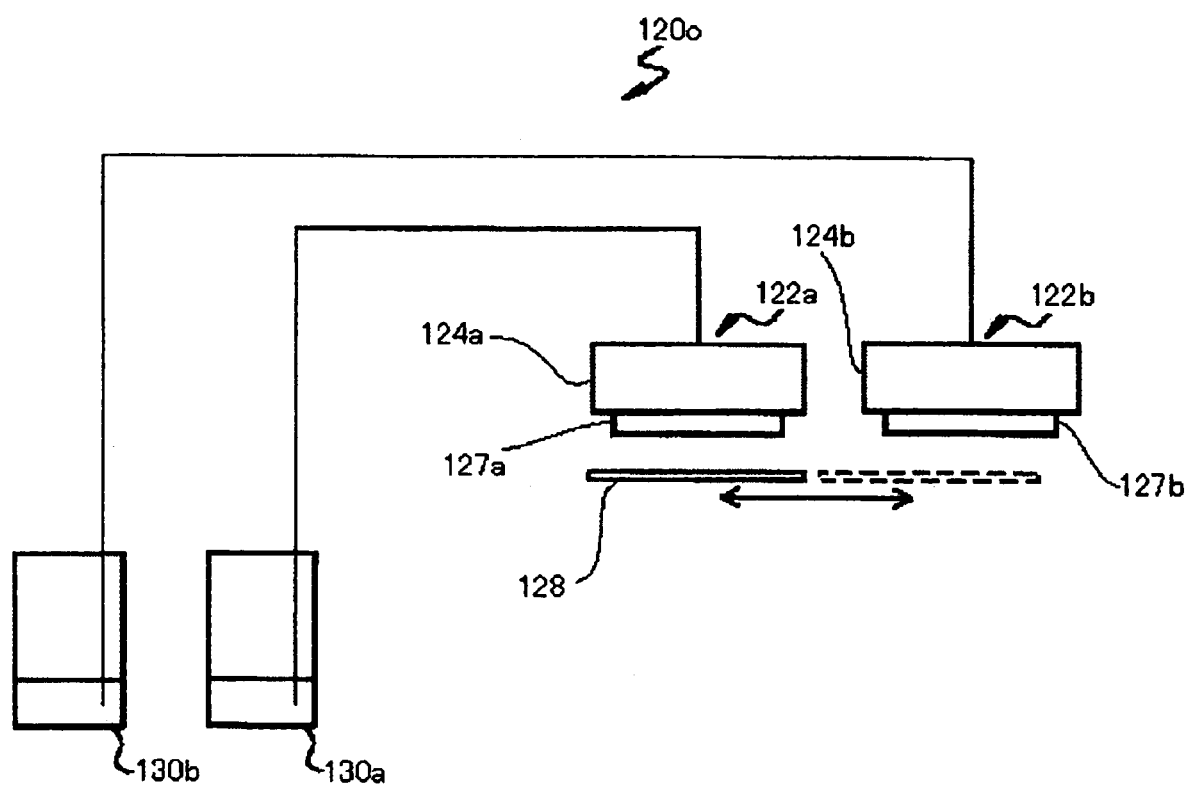
FIG. 15 is a schematic diagram of an ink jet type ejection device according to the second embodiment of implementation of the invention.

FIG. 15 is a diagram illustrating the ink jet head and tank provided in the ejection device 120*o* according to the second embodiment of implementation of the invention. As shown in FIG. 15, the ejection device 120*o* can include two ink jet heads and tanks which are the same as the ink jet head 122 and tank 130 provided in the ejection device 120*a* according to the first embodiment of implementation of the invention, respectively. In the ejection device 120*o*, a positive-working resist and a negative-working resist are ejected onto the substrate at the respective predetermined positions to form a gas flow path. Accordingly, the ejection device 120*o* can include a first tank 130*a* for receiving the negative-working resist, a first ink jet head 122*a* for ejecting the negative-working resist received in the first tank 130*a*, a second tank 130*b* for receiving the positive-working resist and a second ink jet head 122*b* for ejecting the positive-working resist received in the second tank 130*b*. The negative-working resist received in the first tank 130*a* and the positive-working resist received in the second tank 130*b* are adjusted to a predetermined viscosity, e.g., about 10 cPs.

The first ink jet head 122*a* is connected to the first tank 130*a* for receiving the negative-working resist to be ejected through the nozzle (first nozzle) formed on the nozzle forming surface 127*a* of the main body 124*a* of the first ink jet head 122*a*. The second ink jet head 122*b* is connected to the second tank 130*b* for receiving the positive-working resist to be ejected through the nozzle (second) formed on the nozzle forming surface 127*b* of the main body 124*b* of the second ink jet head 122*b*. The configuration of the ejection device 120*p* is the same as that of the ejection device 120*o* and will not be described.

Figure 3:
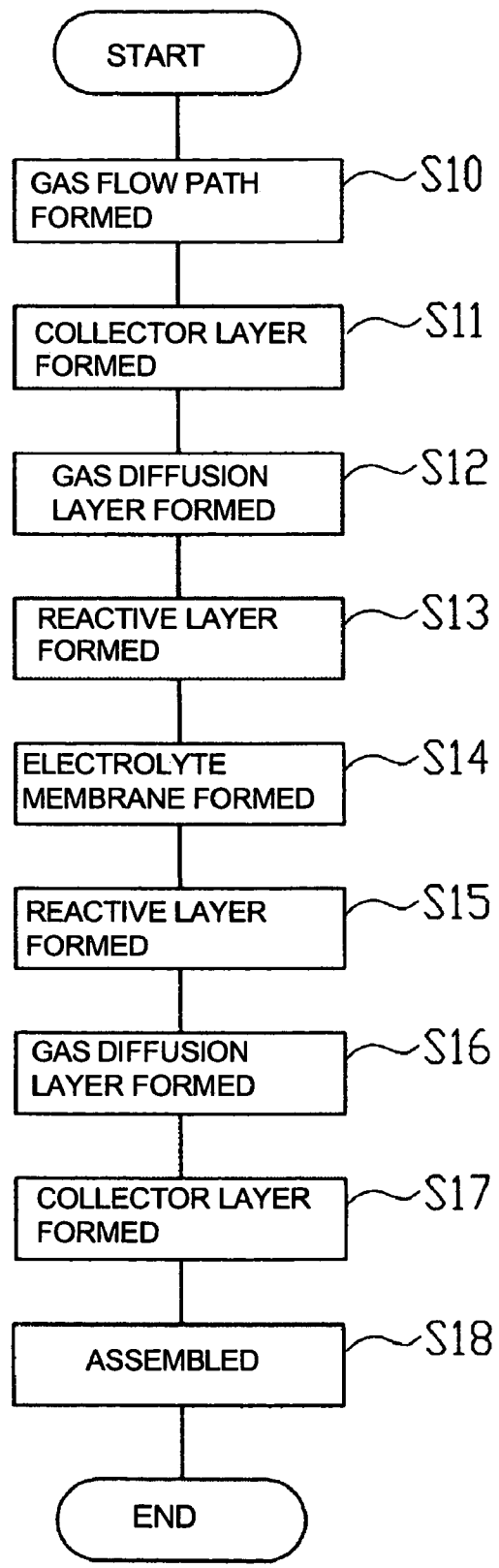
FIG. 3 is a flow chart illustrating a process for the production of a fuel cell according to the first embodiment of implementation of the invention.

In the fuel cell production line according to the second embodiment of implementation of the invention, only the processing for forming the gas flow path is conducted in a manner different from that used in the fuel cell production line according to the first embodiment of implementation of the invention (see FIG. 3). Therefore, the processing for forming the gas flow path will be described hereinafter.

Figure 16:
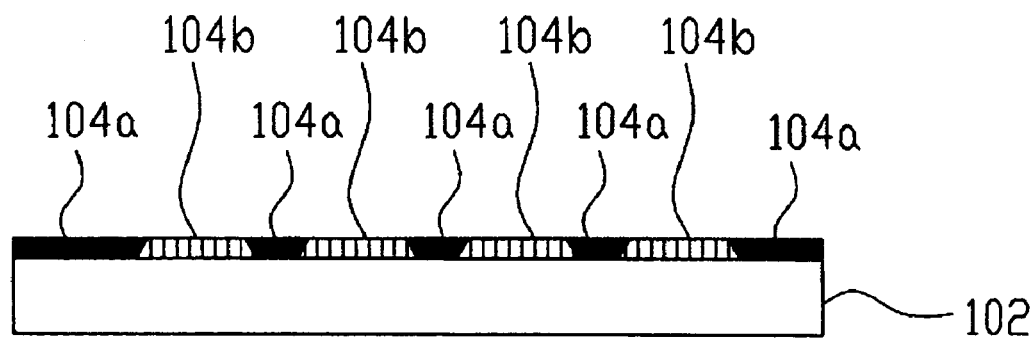
FIG. 16 is a diagram illustrating a process for the formation of a gas flow path according to the second embodiment of implementation of the invention.
Figure 16:
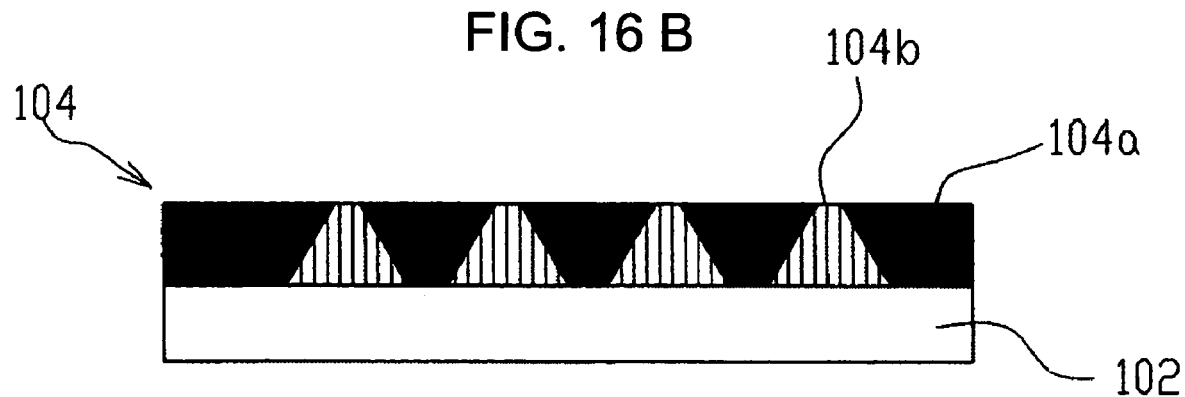
Figure 16:
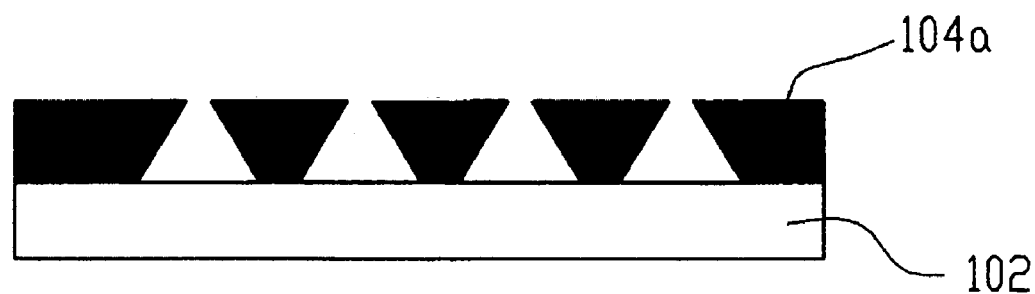

Firstly, in the ejection device 120*o*, a negative-working 104*a* received in the first tank 130*a* is ejected onto the substrate 102 placed on the table 128 through the first nozzle at a predetermined position as shown in FIG. 16(*a*). Subsequently, the table 128 is moved to the position opposing the second ink jet head 122*b* where a positive-working resist 104*b* received in the second tank 130*b* is then ejected onto the substrate 102 at a predetermined position through the second nozzle.

Subsequently, the substrate 102 having the negative-working resist 104*a* and the positive-working resist 104*b* spread thereover is heated to a predetermined temperature in a heating device (not shown) so that the negative-working resist 104*a* and the positive-working resist 104*b* are cured. Subsequently, in the ejection device 120*a*, the negative-working resist 104*a* and the positive-working resist 104*b* are again ejected onto the substrate 102 at predetermined positions. The repetition of the aforementioned processing causes the negative-working resist 104*a* and the positive-working resist 104*b* to be spread in such an arrangement that the section of the positive-working resist 104*b* is a trapezoid the opening width of which is smaller than the bottom width as shown in FIG. 16(*a*) to form a sacrifice layer 104 for use in the formation of a gas flow path. On the surface of the sacrifice layer 104, the distance between the adjacent negative-working resists 104*a* is smaller than the particle diameter of the material constituting the gas diffusion layer formed on the sacrifice layer 104, e.g., porous particulate carbon.

Subsequently, in a cleaning device (not shown), the positive-working resist 104*b* is dissolved with a developer to form a gas flow path (see FIG. 16(*c*)). That is, only the positive-working resist 104*b* is dissolved and removed from the substrate 102 with a developer, leaving the negative-working resist 104*a* behind on the substrate 102. In this manner, the negative-working resist 104*a* thus cured forms a gas flow path having a trapezoidal section the bottom width of which is greater than the opening width.

Subsequently, the substrate 102 having the gas flow path formed therein is conveyed by the belt conveyor BC11 throughout the ejection devices 120*c* to 120*i* where it is then processed in the same manner as in the fuel cell production line according to the first embodiment of implementation of the invention.

In the assembling device 160, the substrate 102' having a second gas flow path formed therein is disposed on the substrate 102 as shown in FIG. 13 to complete the production of a fuel cell. That is, in the ejection device 120p, the substrate (second substrate) 102' having the second gas flow path of a trapezoidal section formed therein for supplying a second reactive gas containing, e.g., oxygen is disposed on the substrate 102 at a predetermined position in the same manner as in the processing in the ejection device 120o to complete the production of a fuel cell.

In accordance with the process for the production of a fuel cell according to the second embodiment of implementation of the invention, a gas flow path the opening width of which is smaller than the particle diameter of particulate carbon constituting the gas diffusion layer is formed using an ink jet type ejection device. That is, a negative-working resist and a positive-working resist are ejected onto the substrate at the respective predetermined positions to form a sacrifice layer from which only the positive-working resist is then removed to form a gas flow path having a trapezoidal section. Accordingly, the particulate carbon constituting the gas diffusion layer enters in the gas flow path, making it possible to prevent the clogging of the gas flow path.

Further, a gas flow path having a trapezoidal section, i.e., gas flow path the opening width of which is smaller than the particle diameter of particulate carbon constituting the gas diffusion layer and the bottom width of which is greater than the opening width is formed. In this arrangement, a fuel cell having a gas flow path formed therein with a sufficient space through which supplied the reactive gas supplied flows can be produced without reducing the amount of gas to be supplied through the gas flow path.

While the aforementioned process for the production of a fuel cell according to the second embodiment of implementation of the invention involves the use of a negative-working resist for the purpose of forming a gas flow path, a UV-curing resin may also be used to form a gas flow path. That is, a UV-curing resin may be ejected in the same pattern as the negative-working resist shown in FIG. 16(c) to form a gas flow path having a trapezoidal section. Alternatively, a transparent resin may be ejected instead of a negative-working resist and a black ink may be ejected instead of a positive-working resist. In this case, a sacrifice layer formed by the transparent resin and the black ink may be irradiated with light so that only the black ink area is baked away to form a gas flow path having a trapezoidal section by the remaining transparent resin as shown in FIG. 16(b).

While the aforementioned process for the production of a fuel cell according to the second embodiment of implementation of the invention involves the formation of a gas flow path having a trapezoidal section, a gas flow path having other shape the opening width of which is smaller than the particle diameter of particulate carbon constituting the gas diffusion layer and the bottom width of which is greater than the opening width may be formed. For example, a gas flow path having a L-shaped section may be formed. The gas flow path having a L-shaped section, too, can prevent the particulate carbon constituting the gas diffusion layer from entry the gas flow path and allows the supply of a sufficient amount of reactive gas.

Figure 17:
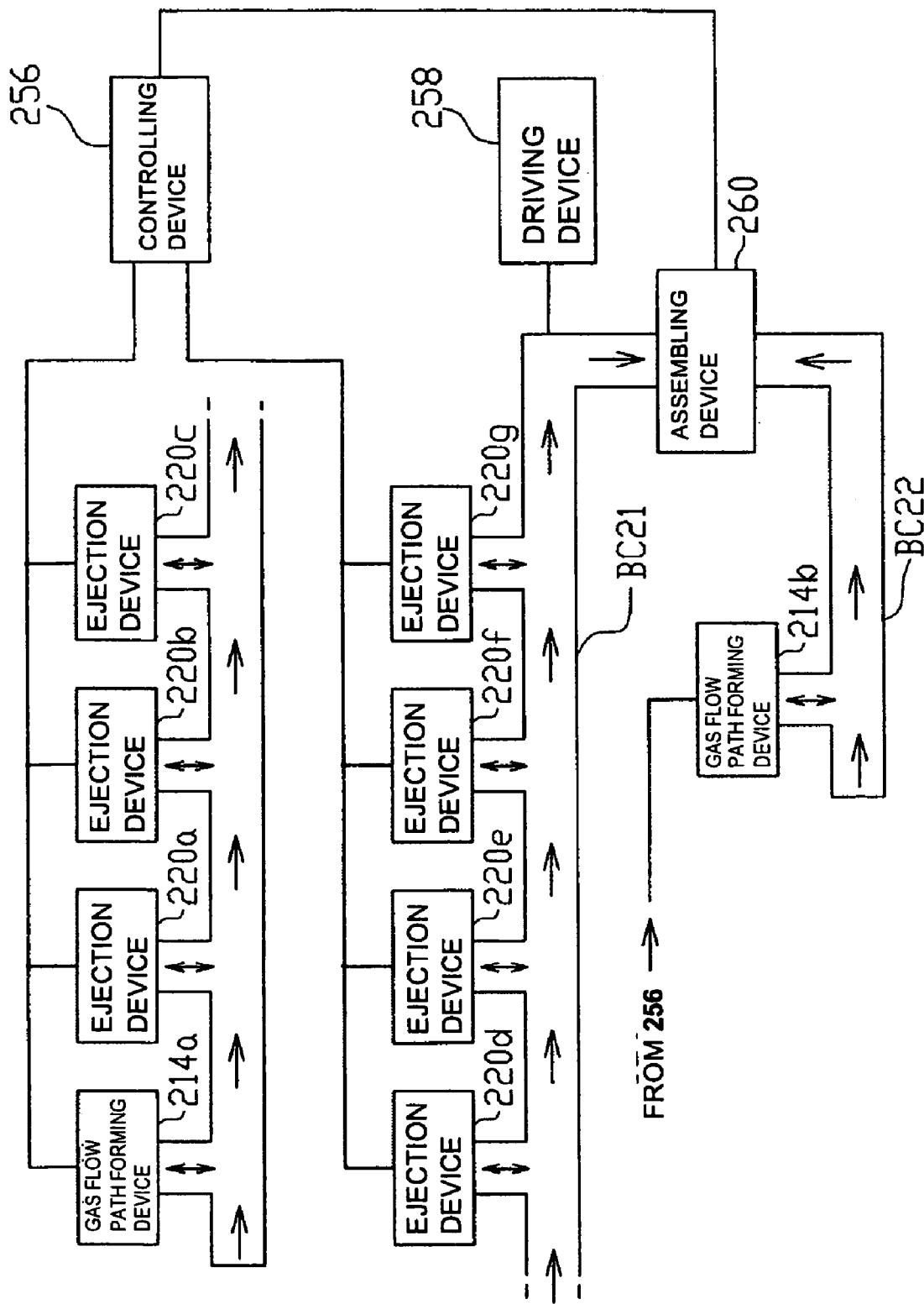
FIG. 17 is a diagram illustrating a fuel cell production line according to a third embodiment of implementation of the invention.

A process for the production of a fuel cell according to the third embodiment of implementation of the invention will be described hereinafter. FIG. 17 is a diagram illustrating the configuration of a fuel cell production line for executing the step of producing a fuel cell according to the third embodiment of implementation of the invention. As shown in FIG. 17, the fuel cell production line can include gas flow path forming devices 214a and 214b, ejection devices 220a to 220g, a belt conveyor BC21 connecting between the gas flow path forming device 214a and the ejection devices 220a to 220g, a belt conveyor BC22 connecting between the gas flow path forming device 214b and an assembling device 260, a driving device 258 for driving the belt conveyors BC21 and BC22 and a controlling device 256 for controlling the entire fuel cell production line.

The gas flow path forming devices 214a and the ejection devices 220a to 220g are arranged in a line at a predetermined interval along the belt conveyor BC21 while the gas flow path forming device 214b is arranged along the belt conveyor BC22. The controlling device 256 is connected to the gas flow path forming devices 214a and 214b, the ejection devices 220a to 220g, the driving device 258 and the assembling device 260. The belt conveyor BC21 is driven according to a control signal from the controlling device 256 to convey the substrate of a fuel cell (hereinafter simply referred to as "substrate") to the gas flow path forming device 214a and the ejection devices 220a to 220g where it is then processed. Similarly, the belt conveyor BC22 is driven according to a control signal from the controlling device 256 to convey a substrate to the gas flow path forming device 214b where it is then processed. In the assembling device 260, the substrates which have been conveyed by the belt conveyors BC21 and BC22, respectively, are assembled to a fuel cell according to control signal from the controlling device 256.

In the fuel cell production line, process to form a gas flow path is conducted in the gas flow path forming device 214a. In the ejection device 220a, process conducted to form a collector layer. In the ejection device 220b, processing is conducted to form a gas diffusion layer. In the ejection device 220c, processing is conducted to form a reactive layer. In the ejection device 220d, processing is conducted to form an electrolyte membrane. In the ejection device 220e, processing is conducted to form a reactive layer. Further, in the ejection device 220f, processing is conducted to form a gas diffusion layer. In the ejection device 220g, processing is conducted to form a collector layer.

In the gas flow path forming device 214b, the substrate is processed to form a gas flow path therein. In the case where the first substrate is processed in the gas flow path forming device 214a and the ejection devices 220a to 220g, the gas flow path forming device 214b executes processing on the second substrate to form a gas flow path therein.

The configuration of the ejection devices 220a to 220g is the same as that of the ejection device 120a according to the first embodiment of implementation of the invention (see FIG. 2) and its description is omitted. However, in the following description, the constituents of the ejection devices 220a to 220g will be described with the same numerals as those of the ejection device 120a. The tank 130 provided in each of the ejection devices 220a to 220g receives corresponding ejection object necessary for predetermined processing to be executed in the ejection devices 220a to 220g. For example, the tank 130 provided in the ejection devices 220a and 220g each receive an ejection object for forming a collector layer. Further, the tanks 130 provided in the ejection devices 220b and 220f each receive an ejection object for forming a gas diffusion layer, the tanks 130 provided in the ejection devices 220c and 220e each receive an ejection object for forming a reactive layer, and the tank 130 provided in the ejection device 220d receives an ejection object for forming an electrolyte membrane.

Figure 18:
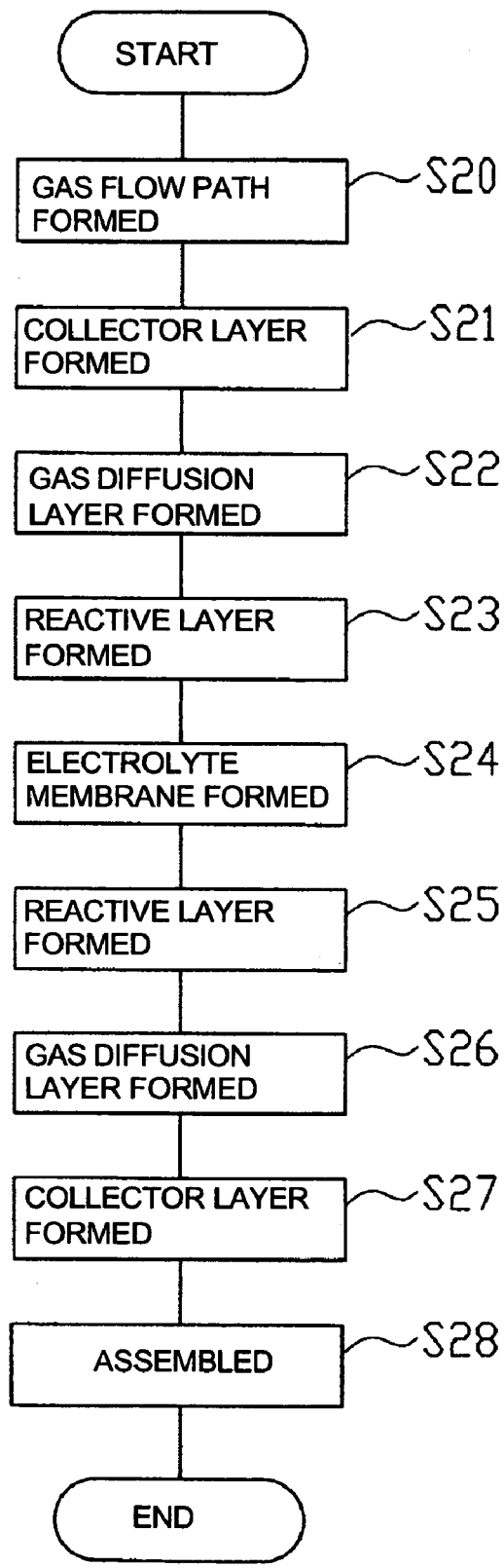
FIG. 18 is a flow chart of a process for the production of a fuel cell according to the third embodiment of implementation of the invention.

A process for the production of a fuel cell using gas flow path forming devices 214a and 214b and ejection devices 220a to 220g according to the third embodiment of implementation of the invention will be described hereinafter in connection with the flow chart of FIG. 18 and other attached drawings.

Figure 19:
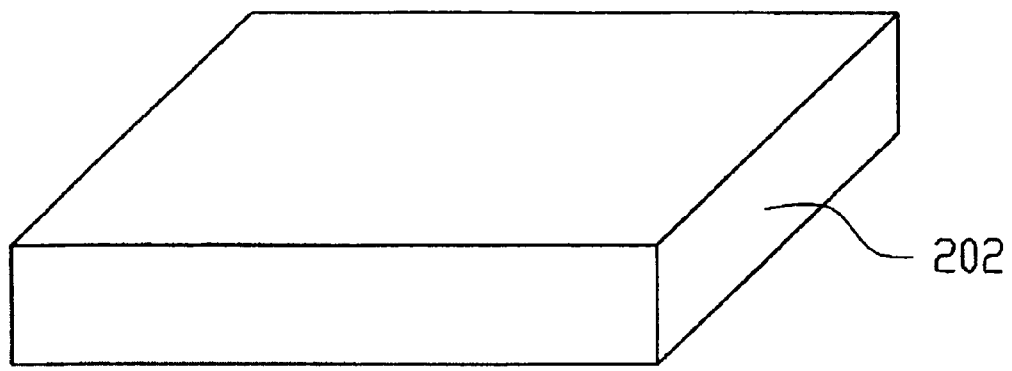
FIG. 19 is a diagram illustrating a process for the formation of a gas flow path according to the third embodiment of implementation of the invention.
Figure 19:
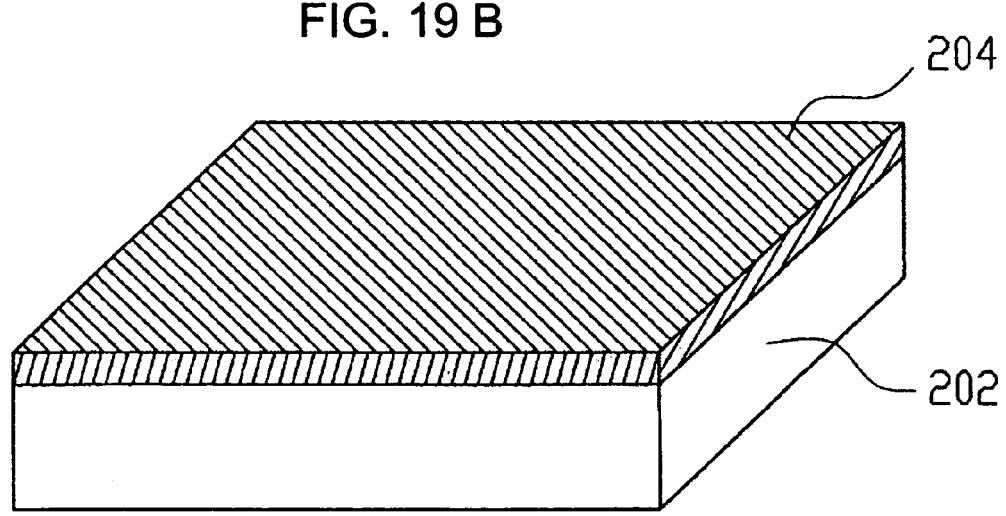

Firstly, a gas flow path for supplying a reactive gas is formed in the substrate (Step S20). That is, a rectangular flat substrate 202 made of, e.g., silicon (first substrate) as shown in FIG. 19(a) is conveyed to the ejection device 214a by the belt conveyor BC21. The surface of the substrate 202 which has been conveyed by the belt conveyor BC21 is then coated with a resin 204, e.g., photo-setting or thermosetting resin (see FIG. 19(b)). Actually, the surface of the substrate 202 is coated with an uncured low viscosity resin 204, e.g., resin 204 having a viscosity of about 20 mPa·s.

Subsequently, a gas flow path forming mold which has been previously prepared is pressed against the resin 204 so that the shape of the gas flow path forming mold is transferred to the resin 204 to form a gas flow path the width of which gradually increases from upstream toward downstream. The gas flow path forming mold has been previously prepared from quartz glass or the like.

Subsequently, the substrate 202 is irradiated with, e.g., laser beam having a short wavelength from the rear side of the gas flow path forming mold so that the resin 204 is cured to transfer the shape of the gas flow path forming mold to the resin 204. In other words, the resin 204 has a low viscosity and thus is cured while the gas flow path forming mold is being pressed there against. Subsequently, the gas flow path forming mold is removed from the resin 204 thus cured to form a gas flow path. The gas flow path forming mold has been previously coated with a release agent so that it can be easily released from the resin 204 thus cured.

The gas flow path may be formed using an ejection device. That is, an aqueous solution of hydrofluoric acid may be ejected from an ejection device onto the substrate 202 in a pattern such that the width of flow path gradually increases from upstream toward downstream to form a gas flow path having a desired shape. Alternatively, the resin 204 may be spread over the substrate 202 from an ejection device in a pattern such that the width of flow path gradually increases from upstream toward downstream to form a gas flow path having a desired shape.

In the case where a gas flow path is formed using an ejection device, e.g., the resin 204 is spread directly over the substrate 202, a process which includes spreading a small amount of the resin 204 directly over the substrate 202, curing the resin 204, spreading the resin 204 over the resin 204 thus cured, and then curing the resin 204 may be repeated to form a gas flow path having an arbitrary section the width of which gradually increases from upstream toward upstream.

Figure 20:
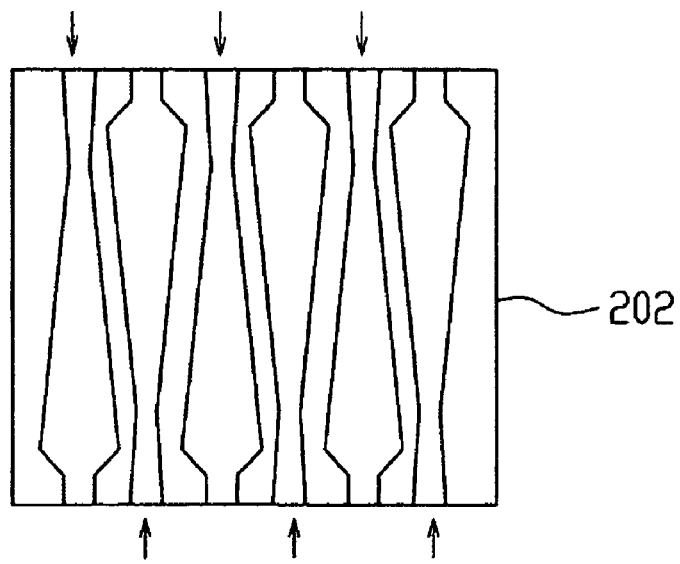
FIG. 20 is another diagram illustrating a process for the formation of a gas flow path according to the third embodiment of implementation of the invention.
Figure 20:
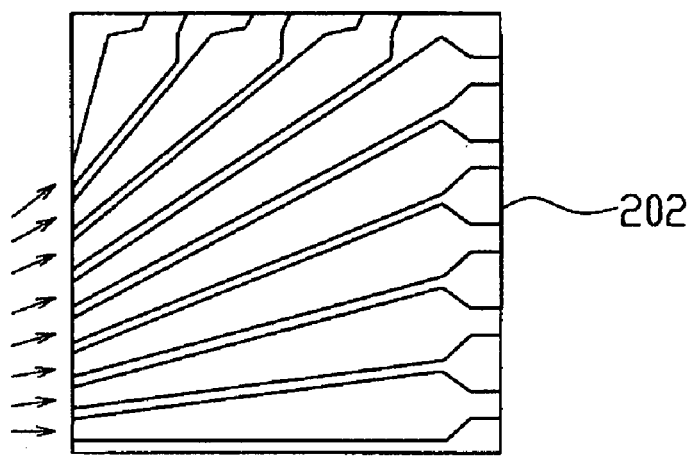
Figure 20:
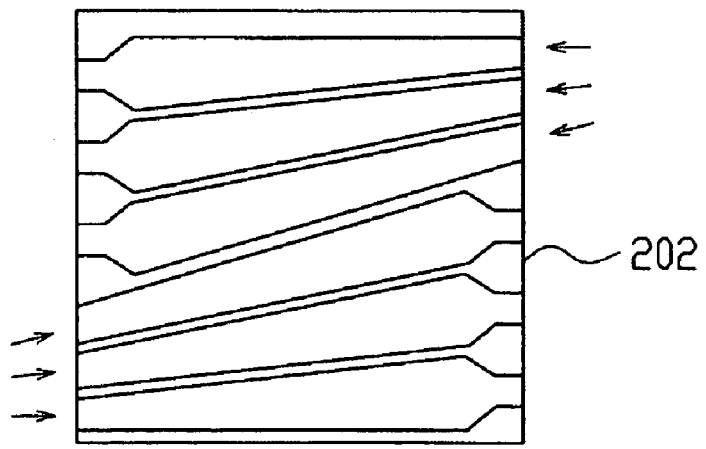

FIG. 20 is a diagram illustrating the substrate having a gas flow path formed therein. FIG. 20(a) is a diagram illustrating the substrate 202 having gas flow paths formed therein, the width of each gas flow path gradually increasing from upstream toward downstream and being reduced at its downmost portion, in such an arrangement that the feed port of the gas flow paths (reactive gas is supplied in the direction shown by the arrow in FIG. 20(a)) are alternately arranged. That is, gas flow paths having a feed port at one side of the substrate 202 for supplying a reactive gas and a discharge port at the other side for discharging the reactive gas thus supplied are alternately arranged. The substrate 202 shown in FIG. 20(a) has gas flow paths formed therein, the width of each gas flow path gradually decreasing from upstream toward downstream, then gradually increasing from upstream toward downstream and is again reduced at its downmost portion, to properly adjust the pressure of reactive gas in the gas flow paths.

FIG. 20(b) is a diagram illustrating the substrate 202 formed therein the width of which gradually increases from upstream toward downstream and is reduced at its downmost portion in such an arrangement that the feed port of the flow paths (reactive gas is supplied in the direction shown by the arrow in FIG. 20(b)) are disposed at one side of the substrate 202. In other words, gas flow paths having a feed port at one side of the substrate 202 for supplying a reactive gas and a discharge port at the other side for discharging the reactive gas thus supplied are formed in the substrate 202. The substrate 202 shown in FIG. 20(b) has gas flow paths formed therein, the width of each gas flow path being reduced at its downmost portion for the purpose of adjusting the pressure of reactive gas which is reduced at downstream.

FIG. 20(c) is a diagram illustrating the substrate 202 having gas flow paths formed therein, the width of each gas flow path gradually increasing from upstream toward downstream and being reduced again at its downmost portion, in such an arrangement that the feed ports (reactive gas is supplied in the direction shown by the arrow in FIG. 20(c)) of half of the gas flow paths are disposed at one side of the substrate 202 and the feed ports of the other half of the gas flow paths are disposed at the other side. In other words, half of the gas flow paths thus formed each have a feed port at one side of the substrate 202 and a discharge port at the other, while the other half of the gas flow paths each have a discharge port at one side of the substrate 202 and a feed port at the other side. The substrate 202 shown in FIG. 20(c) has gas flow paths formed therein, the width of each gas flow path being again reduced at its downmost portion for the purpose of adjusting the pressure of reactive gas which is reduced at downstream. The gas flow path formed at Step S20 may be any of the gas flow paths shown in FIG. 20. The section of the gas flow path thus formed may be semicircular, semielliposoidal or the like.

The substrate 202 having gas flow paths formed therein, the width of each gas flow path gradually increasing from upstream toward downstream and being reduced again at its downmost portion, is transferred from the gas flow path forming device 214a to the belt conveyer BC21 by which it is then conveyed to the ejection device 220a.

Subsequently, a collector layer (first collector layer) for collecting electrons generated by the reaction of the reactive gas is formed on the substrate 202 (Step S21). That is, the substrate 202 which has been conveyed to the ejection device 220a by the belt conveyor BC21 is placed on the table 128 which is then taken into the ejection device 220a. In the ejection device 220a, the material received in the tank 130 for forming a collector layer 206, e.g., electrically-conductive material, such as copper, is ejected onto the substrate 202 placed on the table 128 through the nozzles on the nozzle forming surface 126. During this procedure, the electrically-conductive material is ejected in a pattern such that the diffusion of reactive gas supplied into the gas flow path cannot be prevented, e.g., in a mesh pattern, to form the collector layer 206.

Figure 21:
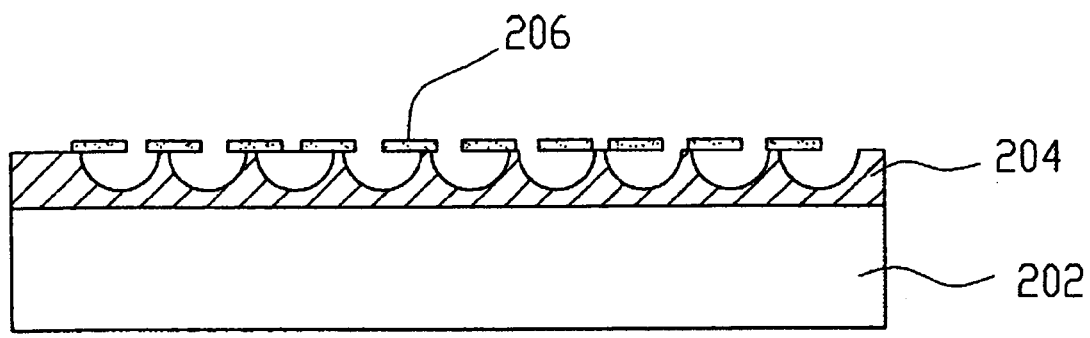
FIG. 21 is an end view of a substrate processed at a process for the production of a fuel cell according to the third embodiment of implementation of the invention.

FIG. 21 is an end view of the substrate 202 having the collector layer 206 formed thereon. As shown in FIG. 21, when an electrically-conductive material, such as copper, is ejected in a mesh pattern, the collector layer 206 is formed. FIG. 21 schematically illustrates a gas flow path the width of which gradually increases from upstream toward downstream and is reduced again at its downmost portion. In the following drawings, too, the gas flow path is shown similarly to FIG. 21. The substrate 202 having the collector layer 206 formed thereon is transferred from the table 128 to the belt conveyor BC21 by which it is then conveyed to the ejection device 220b.

Subsequently, a gas diffusion layer (first gas diffusion layer) for diffusing the reactive gas which is supplied through the gas flow path formed in the substrate 202 is formed on the collector layer 206 formed at Step S21 (Step S22). That is, the substrate 202 which has been conveyed to the ejection device 220*b* by the belt conveyor BC21 is placed on the table 128 which is then taken into the ejection device 220*b*. In the ejection device 220*b*, the material received in the tank 130 for forming a gas diffusion layer 208, e.g., particulate carbon, is ejected onto the collector layer 206 through the nozzles on the nozzle forming surface 126 to form the gas diffusion layer 208 for diffusing the reactive gas (first reactive gas) supplied through the gas flow path.

Figure 22:
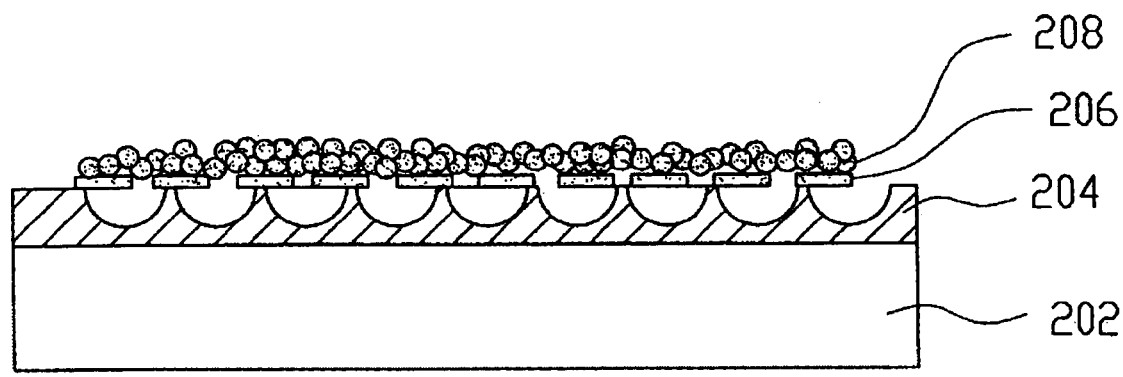
FIG. 22 is an end view of a substrate processed at a process for the production of a fuel cell according to the third embodiment of implementation of the invention.

FIG. 22 is an end view of the substrate 202 having the gas diffusion layer 208 formed thereon. As shown in FIG. 22, particulate carbon which also acts as an electrode is ejected onto the collector layer 206 to form the gas diffusion layer 208 for diffusing the reactive gas. As the particulate carbon constituting the gas diffusion layer 208, there is used a porous particulate carbon having a size such that the reactive gas supplied through the gas flow path can be sufficiently diffused. For example, a porous particulate carbon having a diameter of about 0.1 to 1 μm may be used. The substrate 202 having the gas diffusion layer 208 formed thereon is transferred from the table 128 onto the belt conveyor BC21 by which it is then conveyed to the ejection device 220*c*.

Subsequently, a reactive layer (first reactive layer) for reacting the reactive gas supplied through the gas flow path formed on the substrate 202 is formed on the gas diffusion layer 208 formed at Step S22 (Step S23). That is, the substrate 202 which has been conveyed to the ejection device 220*c* by the belt conveyor BC21 is placed on the table 128 which is then taken into the ejection device 220*c*. In the ejection device 220*c*, the material received in the tank 130 for forming a reactive layer, e.g., particulate carbon having particulate platinum of a particle diameter of few nanometers to several tens of nanometers supported thereon as catalyst (carbon-supported platinum) is ejected onto the gas diffusion layer 208 to form a reactive layer 210. As the carbon supporting the particulate platinum, there is used the same particulate carbon as that constituting the gas diffusion layer 208, i.e., porous particulate carbon having the same particle diameter as that of the particulate carbon constituting the gas diffusion layer 208. A dispersion of particulate platinum in a solvent with a dispersant may be spread over the gas diffusion layer 208 and then heated to 200° C. in a nitrogen atmosphere so that the dispersant is removed to form the reactive layer 210. In this case, particulate platinum is attached to the surface of the particulate carbon constituting the gas diffusion layer 208 as a catalyst to form the reactive layer 210.

Figure 23:
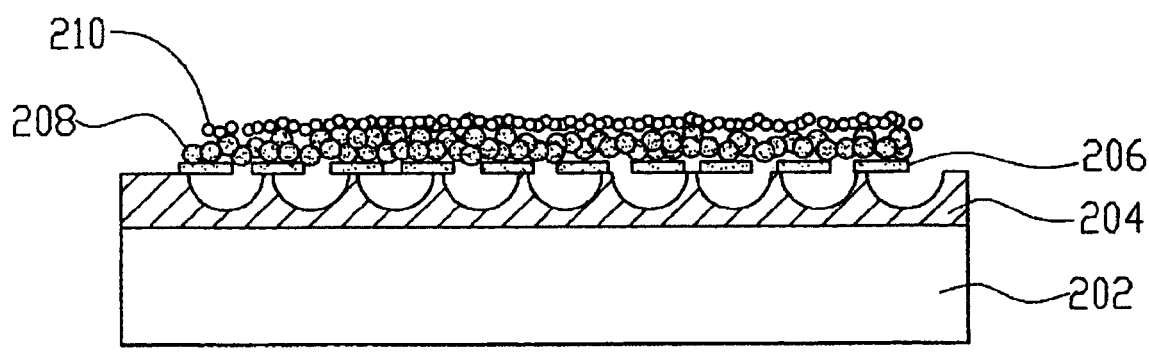
FIG. 23 is an end view of a substrate processed at a process for the production of a fuel cell according to the third embodiment of implementation of the invention.

FIG. 23 is an end view of the substrate 102 having the reactive layer 210 formed thereon. As shown in FIG. 23, carbon having particulate platinum supported thereon as a catalyst is spread over the gas diffusion layer 208 to form the reactive layer 210. In FIG. 23, only the particulate platinum is shown as the reactive layer 210 so that the reactive layer 210 and the gas diffusion layer 208 can be easily distinguished from each other. In the following drawings, the reactive layer is shown similarly to FIG. 23. The substrate 202 having the reactive layer 210 formed thereon is transferred from the table 128 to the belt conveyor BC21 by which it is then conveyed to the ejection device 220*d*.

Subsequently, an electrolyte membrane, such as an ion exchange membrane, is formed on the reactive layer 210 formed at Step S23 (Step S24). That is, the substrate 202 which has been conveyed to the ejection device 220*d* by the belt conveyor BC21 is placed on the table 128 which is then taken into the ejection device 220*d*. In the ejection device 220*d*, the material received in the tank 130 for forming the electrolyte membrane, e.g., solution containing perfluorocarbon or sulfonic acid polymer (e.g., Nafion (trade mark)), is ejected onto the reactive layer 210 through the nozzles on the nozzle forming surface 126 to form an electrolyte membrane 212.

Figure 24:
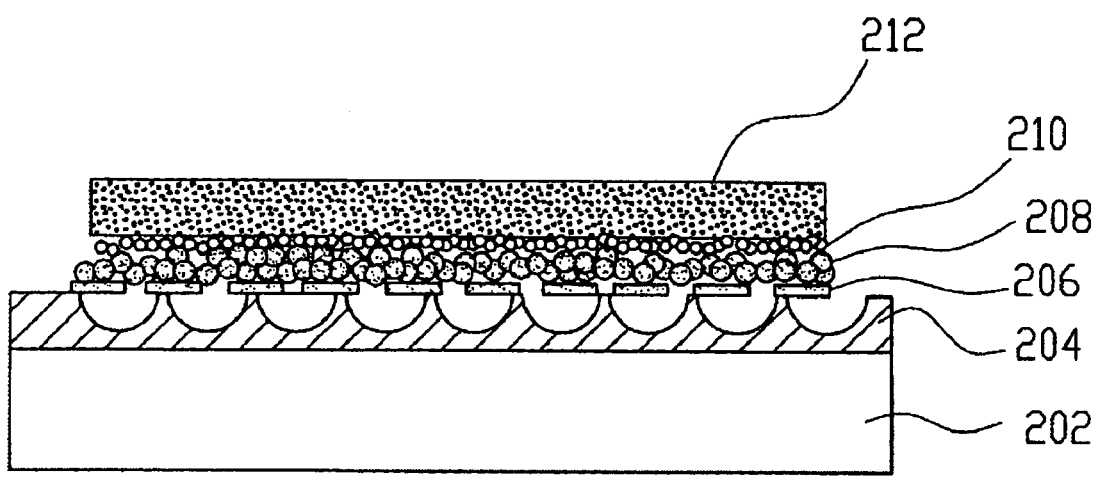
FIG. 24 is an end view of a substrate processed at a process for the production of a fuel cell according to the third embodiment of implementation of the invention.

FIG. 24 is an end view of the substrate 202 having the electrolyte membrane 212 formed thereon. As shown in FIG. 24, the electrolyte membrane 212 having a predetermined thickness is formed on the reactive layer 210. The substrate 202 having the electrolyte membrane 212 formed thereon is transferred from the table 128 to the belt conveyor BC21 by which it is then conveyed to the ejection device 220*e*.

Subsequently, a reactive layer (second reactive layer) is formed on the electrolyte membrane 212 formed at Step S24 (Step S25). That is, the substrate 202 which has been conveyed to the ejection device 220*e* by the belt conveyor BC21 is placed on the table 128 which is then taken into the ejection device 220*e*. In the ejection device 220*e*, carbon having particulate platinum supported thereon as a catalyst is ejected onto the substrate 202 in the same manner as in the ejection device 220*c* to form a reactive layer 210'.

Figure 25:
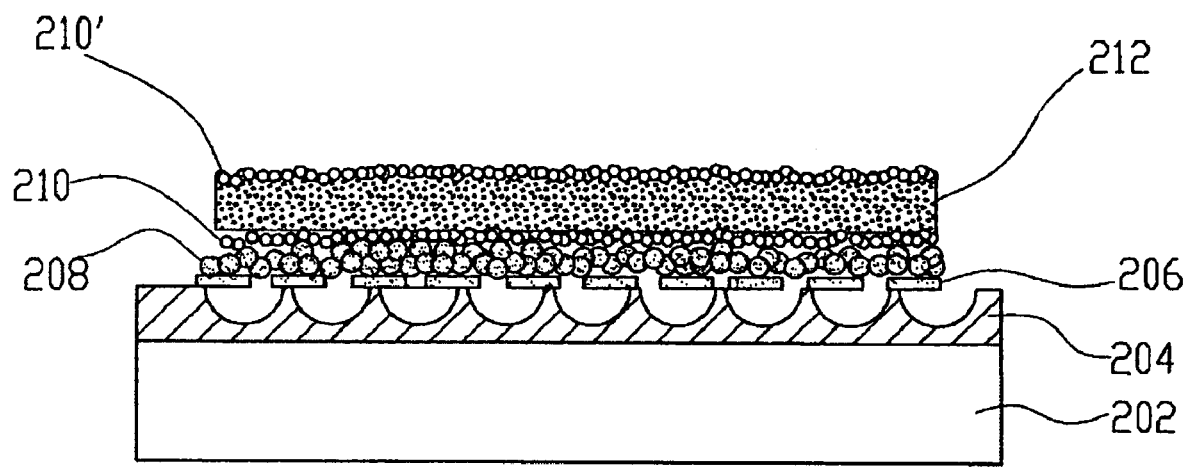
FIG. 25 is an end view of a substrate processed at a process for the production of a fuel cell according to the third embodiment of implementation of the invention.

FIG. 25 is an end view of the substrate 202 having the reactive layer 210' formed on the electrolyte membrane 212. As shown in FIG. 25, carbon having particulate platinum supported thereon as a catalyst is spread over the electrolyte membrane 212 to form the reactive layer 210'. The reactive layer 210' is a layer which reacts on the basis of a second reactive gas, e.g., reactive gas containing oxygen.

Subsequently, a gas diffusion layer (second gas diffusion layer) for diffusing the reactive gas (second reactive gas) is formed on the reactive layer 210' formed at Step S25 (Step S26). That is, the substrate 202 having the reactive layer 210' formed thereon is conveyed by the belt conveyor BC21 to the ejection device 220*f* where it is then coated with a porous particulate carbon having a predetermined particle diameter in the same manner as in the ejection device 220*b* to form a gas diffusion layer 208'.

Figure 26:
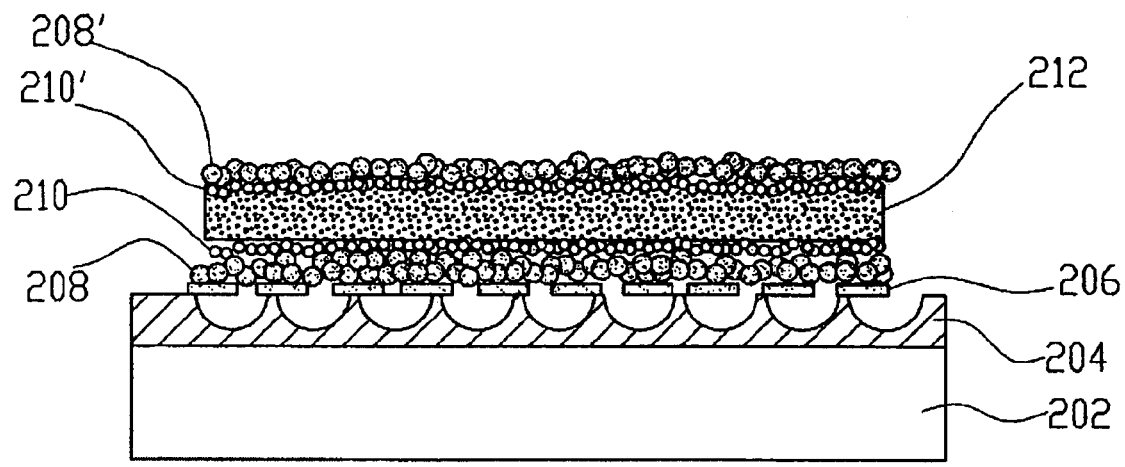
FIG. 26 is an end view of a substrate processed at a process for the production of a fuel cell according to the third embodiment of implementation of the invention.

FIG. 26 is an end view of the substrate 202 having the gas diffusion layer 208' formed on the reactive layer 210'. As shown in FIG. 26, a porous particulate carbon is spread over the reactive layer 210' to form the gas diffusion layer 208'.

Subsequently, a collector layer (second collector layer) is formed on the gas diffusion layer 208' formed at Step S26 (Step S27). That is, the substrate 202 which has been conveyed to the ejection device 220*g* by the belt conveyor BC21 is placed on the table 128 which is then taken into the ejection device 220*g*, where it is then processed in the same manner as in the ejection device 220*a* to form a collector layer 206' on the gas diffusion layer 208'.

Figure 27:
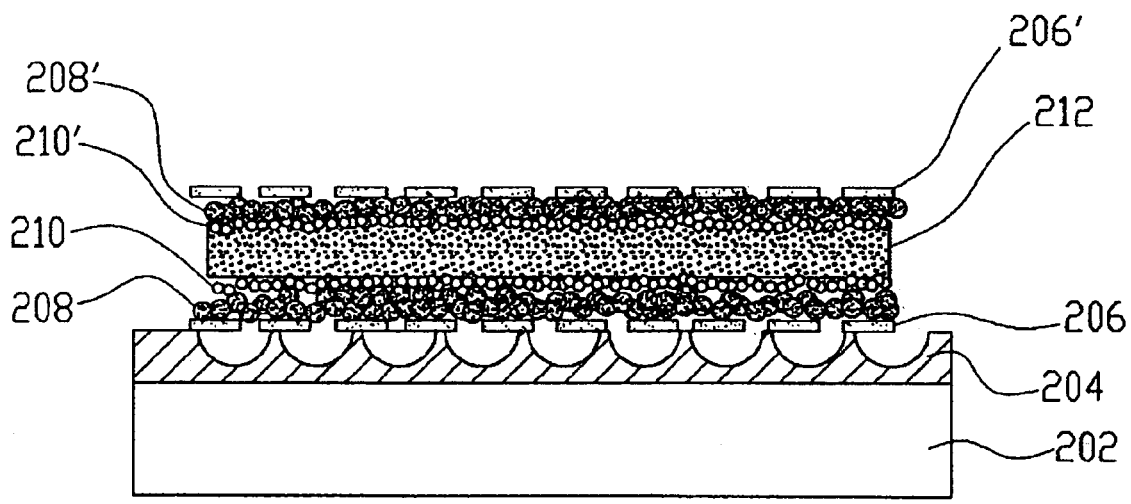
FIG. 27 is an end view of a substrate processed at a process for the production of a fuel cell according to the third embodiment of implementation of the invention.

FIG. 27 is an end view of the substrate 202 having the collector layer 206' formed on the gas diffusion layer 208'. As shown in FIG. 27, the substrate 202 is processed according to Step S27 as mentioned above to form the collector layer 206'. The substrate 202 having a collector layer 206' formed thereon is transferred from the table 128 to the belt conveyor BC21 by which it is then conveyed to the assembling device 260.

Figure 28:
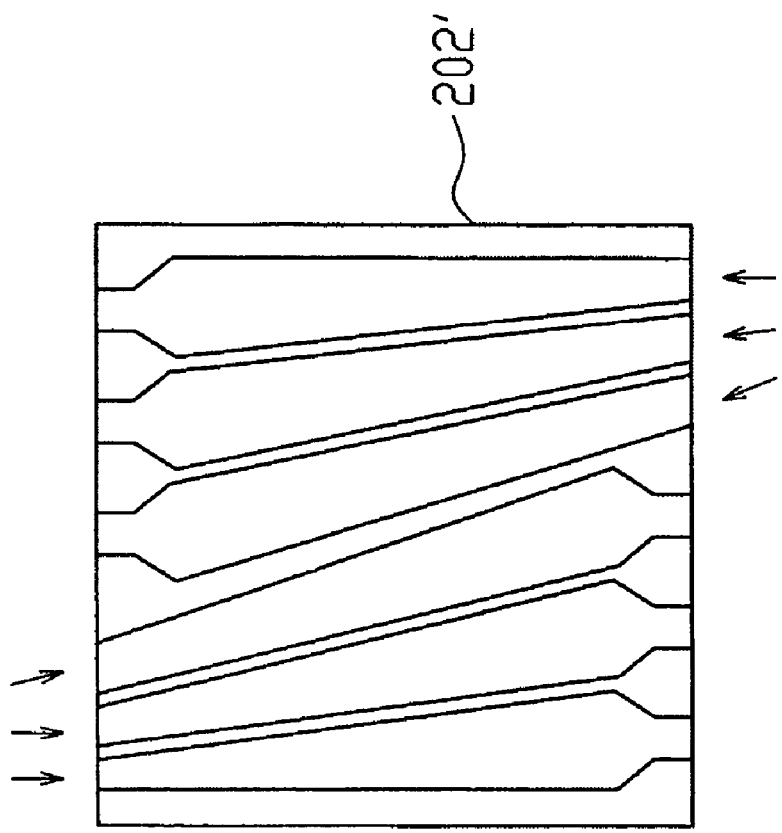
FIG. 28 is a diagram illustrating a step of assembling a fuel cell according to the third embodiment of implementation of the invention.
Figure 28:
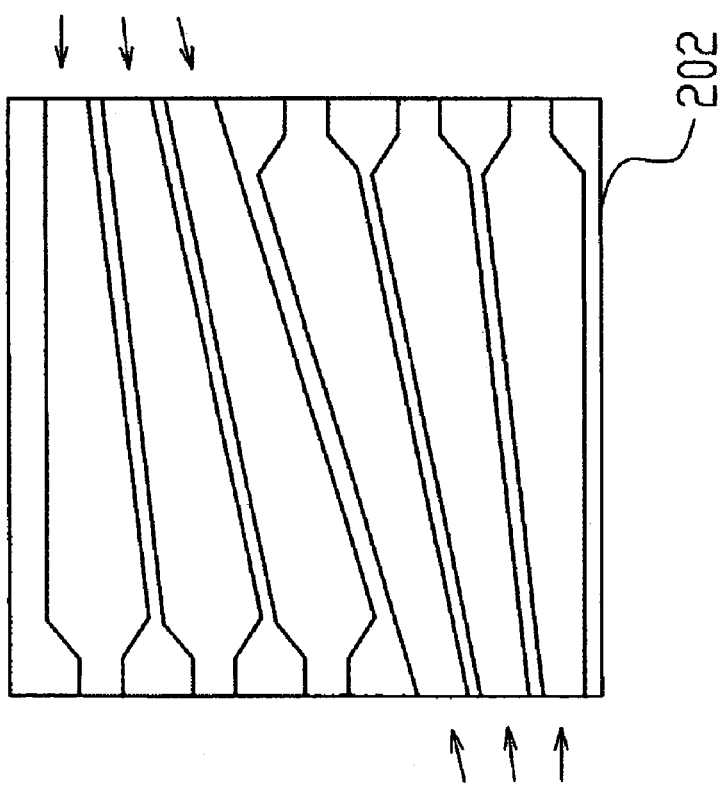

Subsequently, a substrate having a gas flow path formed therein (second substrate) is provided on the substrate (first substrate) on which the collector layer has been formed at Step S27 to assemble a fuel cell (Step S28). That is, in the assembling device 260, the substrate 202' (second substrate) which has been conveyed by the belt conveyor BC22 is disposed on the substrate 202 (first substrate) which has been conveyed by the belt conveyor BC21 to assemble a fuel cell. The substrate 202' has a second gas flow path formed therein which is different from those formed according to processing at Steps S20 to S27 mentioned above. In other words, in the ejection device 214b, the second gas flow path is formed in the same manner as in the ejection device 214a. Accordingly, the substrate 202' is disposed on the substrate 202 such that the gas flow paths formed in the substrate 202, the width of each gas flow path gradually increasing from upstream toward downstream and being reduced again at its downmost portion, and the gas flow paths formed in the substrate 202', the width of each gas flow path gradually increasing from upstream toward downstream and being reduced again at its downmost portion cross each other. In other words, the substrate 202' shown in FIG. 28(b) is disposed on the substrate 202 shown in FIG. 28(a) such that the gas flow paths formed in the substrate 202 and the gas flow paths formed in the substrate 202' cross each other, to assemble a fuel cell. Thus, the production of a fuel cell is completed.

Figure 29:
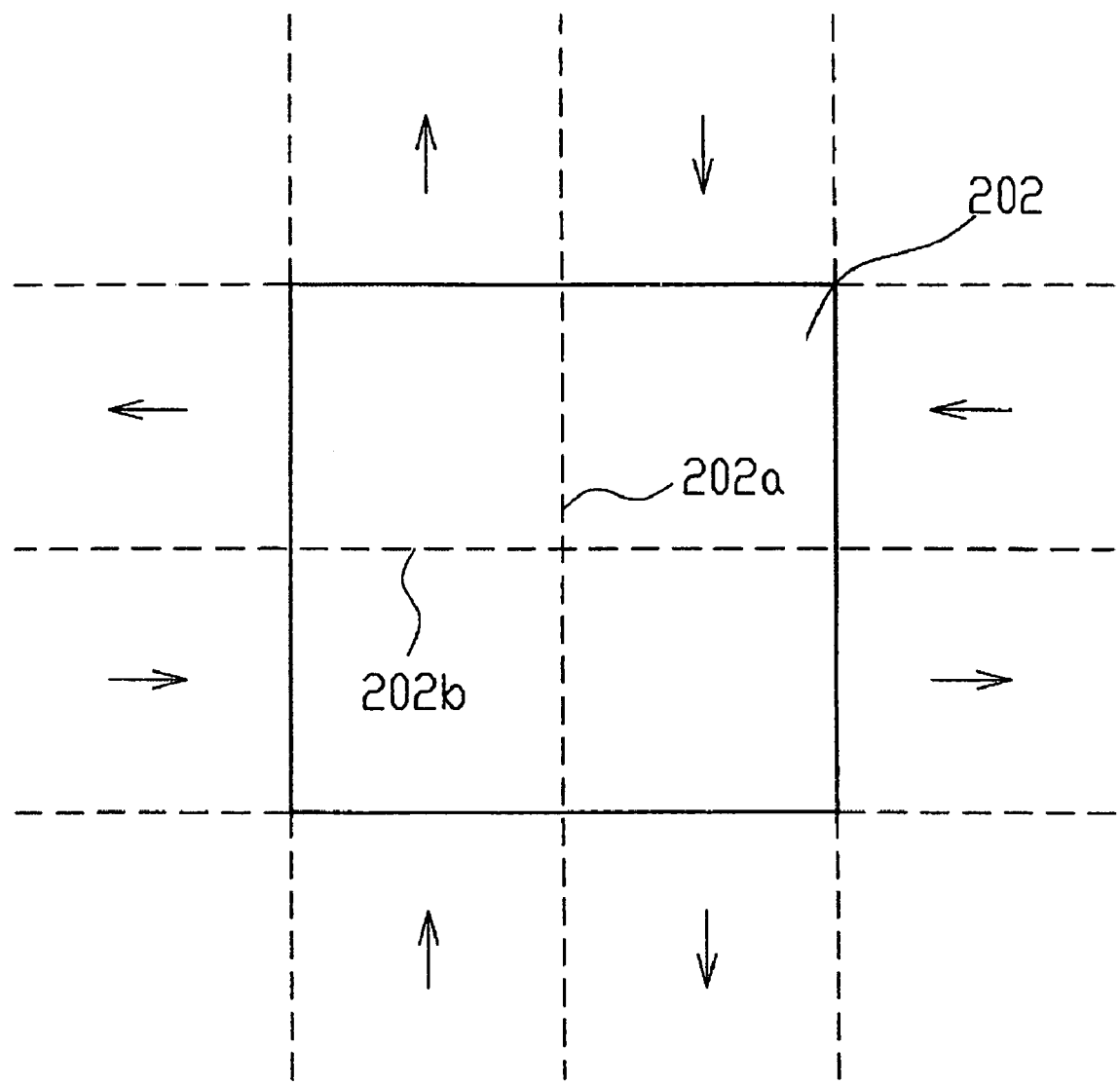
FIG. 29 is a diagram illustrating the flow of gas in a fuel cell according to the third embodiment of implementation of the invention.

FIG. 29 is a diagram illustrating the flow of reactive gas in a fuel cell produced by disposing the substrate 202' shown in FIG. 28(b) on the substrate 202 shown in FIG. 28(a). As shown in FIG. 29, the direction of flow of reactive gas supplied on the substrate 202 is reversed at the right and left sides of the central line 202a extending longitudinally in the drawing. Further, the direction of flow of reactive gas supplied on the substrate 202 is reversed at the upper and lower sides of the central line 202b extending crosswise in the drawing. Therefore, since in this arrangement, the upstream and downstream of the gas flow path are disposed at the right and left sides of the central line 202a, for example, it is possible to maintain the amount of reactive gas to be supplied onto the reactive layer uniform. Further, a first reactive gas supplying device for supplying a first reactive gas containing, e.g., oxygen and a second reactive gas supplying device for supplying a second reactive gas containing, e.g., hydrogen can be properly disposed, respectively.

Figure 30:
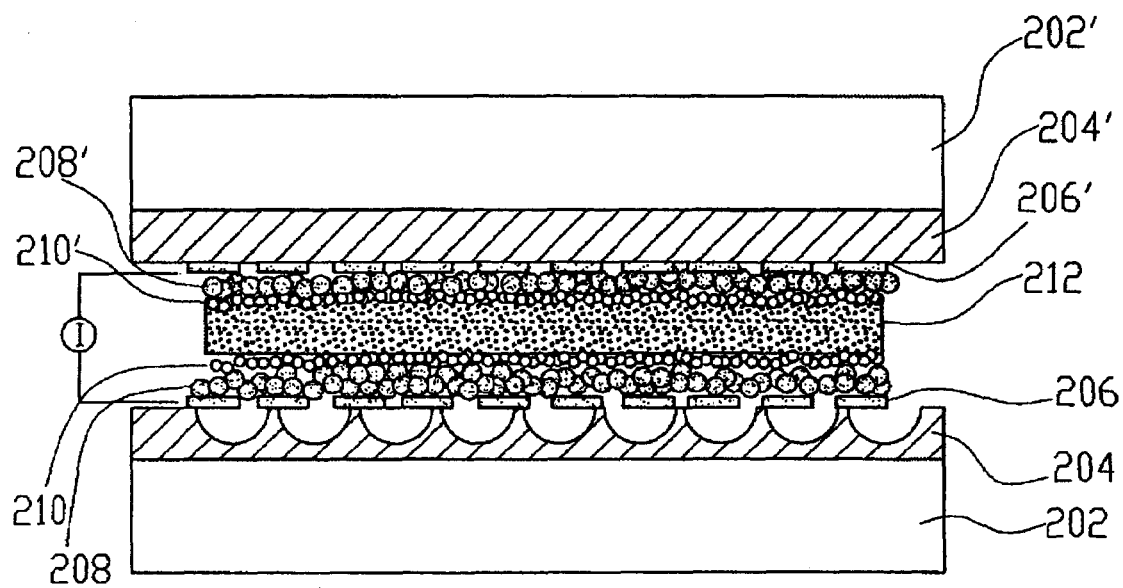
FIG. 30 is a end view of a fuel cell according to the third embodiment of implementation of the invention.

FIG. 30 is an end view of the fuel cell thus completed. As shown in FIG. 30, the substrate 202' having a second gas flow path formed therein is disposed on the substrate 202 at a predetermined position to complete the production of a fuel cell which supplies a first reactive gas and a second reactive gas through a first gas flow path and a second gas flow path formed on a first substrate and a second substrate, respectively.

The fuel cell produced by the production process according to the aforementioned third embodiment of implementation of the invention can be incorporated as a power supply source in electronic devices, particularly portable electronic devices such as cellular phone. In other words, in accordance with the aforementioned process for the production of a fuel cell, the formation of a gas flow path the width of which gradually increases from upstream toward downstream makes it easy to produce a small-sized fuel cell having an enhanced efficiency of reaction of reactive gas. As a result, the fuel cell thus produced can be incorporated as a power supply source in small-sized electronic devices such as cellular phone.

The fuel cell according to the third embodiment of implementation of the invention has gas flow paths formed therein, the width of each gas flow path gradually increasing from upstream toward downstream and being reduced again at its downmost portion. As a result, the difference in the amount of reactive gas to be supplied onto the reactive layer otherwise generated between at upstream and downstream can be prevented, making it possible to supply the reactive gas onto the reactive layer uniformly both at upstream and downstream.

Further, the fuel cell according to the aforementioned third embodiment of implementation of the invention can maintain the reactive gas supplied to the reactive layer uniformly both at upstream and downstream of the gas flow path and thus allows effective performance of expensive platinum which acts as a catalyst in the reactive layer, making it possible to enhance the efficiency of reaction of reactive gas and hence the electricity-generating efficiency thereof.

Moreover, in accordance with the process for the production of a fuel cell according to the aforementioned third embodiment of implementation of the invention, gas flow paths, the width of each gas flow path gradually increasing from upstream toward downstream and being reduced again at its downmost portion, are formed. Therefore, a fuel cell can be produced which allows proper adjustment of the pressure of reactive gas in the gas flow path and thus exhibits an enhanced electricity-generating efficiency.

While the fuel cell according to the aforementioned third embodiment of implementation of the invention has gas flow paths formed therein, the width of each flow path gradually increasing from upstream toward downstream and being reduced again at its downmost portion, gas flow paths, the width of each gas flow path gradually increasing from downstream to its downmost portion, may be formed.

While the process for the production of a fuel cell according to the aforementioned third embodiment of implementation of the invention involves the formation of gas flow path using a gas flow path forming mold in a gas flow path forming device, the gas flow path may be formed without using any gas flow path forming mold. For example, an etching solution may be ejected onto a resist solution which has been spread over the substrate in a predetermined pattern using an ejection device to form a gas flow path the width of which gradually increases from upstream toward downstream. Alternatively, a resin may be spread over the substrate using an ejection device to form a gas flow path the width of which gradually increases from upstream toward downstream.

Figure 31:
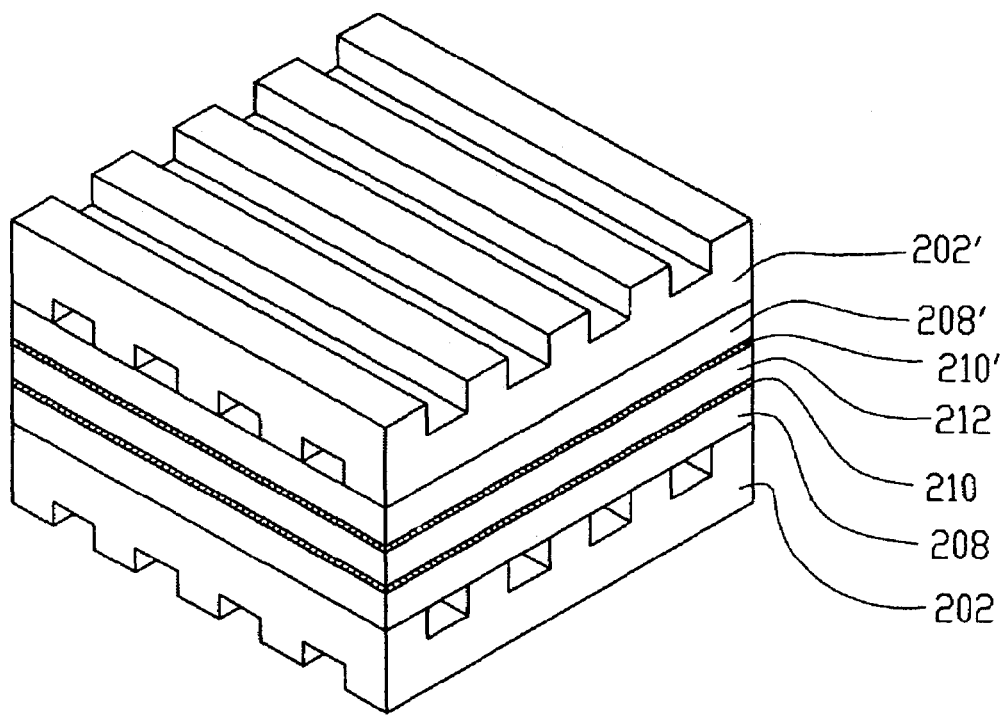
FIG. 31 is a diagram of a large-sized fuel cell comprising a stack of fuel cells according to the third embodiment of implementation of the invention.

While the process for the production of a fuel cell according to the aforementioned third embodiment of implementation of the invention involves the production of a small-sized fuel cell, a plurality of fuel cells may be stacked to produce a large-sized fuel cell. In other words, as shown in FIG. 31, the substrate 202' of the fuel cell thus produced may further have gas flow paths formed on the back surface thereof and a gas diffusion layer, a reactive layer, an electrolyte membrane and other layers formed on the back surface thereof in the same manner as in the aforementioned process for the production of a fuel cell. A plurality of these fuel cells may then be stacked to produce a large-sized fuel cell. The large-sized fuel cell thus produced can be used as a power supply source for electric car to provide a clean-energy for an automobile designed taking global atmosphere in proper account.

Figure 32:
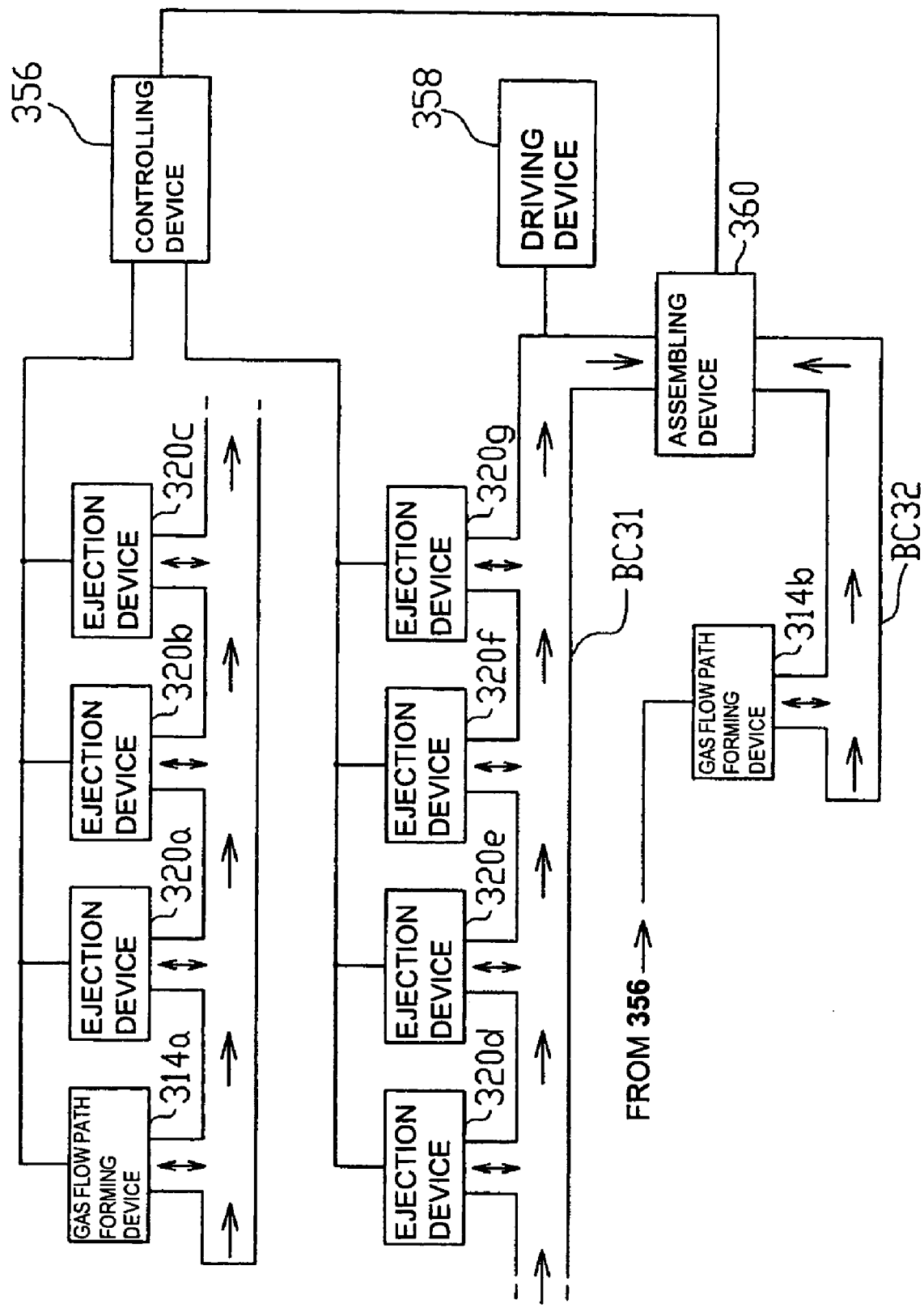
FIG. 32 is a diagram illustrating a fuel cell production line according to a fourth embodiment of implementation of the invention.

A process for the production of a fuel cell according to the fourth embodiment of implementation of the invention will be described hereinafter. FIG. 32 is a diagram illustrating the configuration of the fuel cell production line for executing a process for the production of a fuel cell according to the fourth embodiment of implementation of the invention. As shown in FIG. 32, the fuel cell production line can include gas flow path forming devices 314a, 314b, ejection devices 320a to 320g, a belt conveyor BC31 connecting between the gas flow path forming device 314a, the ejection devices 320a to 320g and the assembling device 360, a belt conveyor BC32 connecting between the gas flow path forming device 314b and the assembling device 360, a driving device 358 for driving the belt conveyors BC31 and BC32 and a controlling device 356 for controlling the entire fuel cell production line.

The gas flow path forming devices 314a and the ejection devices 320a to 320g are arranged in a line at a predetermined interval along the belt conveyor BC31 and the gas flow path forming device 314b is arranged along the belt conveyor BC32. The controlling device 356 is connected to the gas flow path forming devices 314a and 314b, the ejection devices 320a to 320g, the driving device 358 and the assembling device 360. The belt conveyor BC31 is driven according to control signal from the controlling device 356 to convey the substrate of fuel cell (hereinafter simply referred to as "substrate") to the gas flow path forming device 314a and the ejection devices 320a to 320g where it is then processed. Similarly, the belt conveyor BC32 is driven according to control signal from the controlling device 356 to convey the substrate to the gas flow path forming device 314b where it is then processed. In the assembling device 360, the substrates which have been conveyed by the belt conveyors BC31 and BC32, respectively, are assembled to a fuel cell according to control signal from the controlling device 356.

In the fuel cell production line, the substrate is processed to form a gas flow path at the gas flow path forming device 314a. In the ejection device 320a, processing is conducted to form a collector layer. In the ejection device 320b, processing is conducted to form a gas diffusion layer. In the ejection device 320c, processing is conducted to form a reactive layer. In the ejection device 320d, processing is conducted to form an electrolyte membrane. In the ejection device 320e, processing is conducted to form a reactive layer. Further, in the ejection device 320f, processing is conducted to form a gas diffusion layer. In the ejection device 320g, processing is conducted to form a collector layer.

In the gas flow path forming device 314b, the substrate is processed to form a gas flow path therein. In the case where the first substrate is processed in the gas flow path forming device 314a and the ejection devices 320a to 320g, the gas flow path forming device 314b executes processing on the second substrate to form a gas flow path therein.

The configuration of the ejection devices 320a to 320g is the same as that of the ejection device 120a according to the first embodiment of implementation of the invention (see FIG. 2) and its description is omitted. However, in the following description, the constituents of the ejection devices 320a to 320g will be described with the same numerals as those of the ejection device 120a. The tanks 130 provided in each of the ejection devices 320a to 320g receives an ejection object necessary for predetermined processing to be executed in the ejection devices 320a to 320g. For example, the tanks 130 provided in the ejection devices 320a and 320g each receive an ejection object for forming a collector layer. Further, the tanks 130 provided in the ejection devices 320b and 320f each receive an ejection object for forming a gas diffusion layer, the tanks 130 provided in the ejection devices 320c and 320e each receive an ejection object for forming a reactive layer, and the tank 130 provided in the ejection device 320d receives an ejection object for forming an electrolyte membrane.

Figure 33:
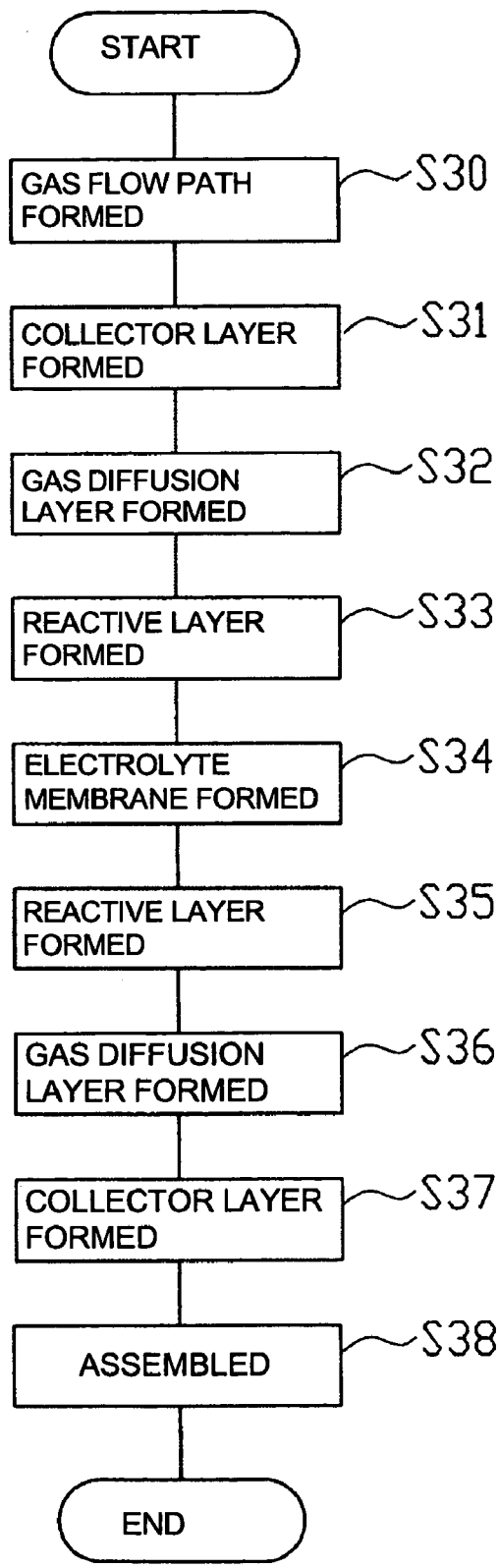
FIG. 33 is a flow chart of the process for the production of a fuel cell according to the fourth embodiment of implementation of the invention.

A process for the production of a fuel cell using gas flow path forming devices 314a, 314b and ejection devices 320a to 320g according to the fourth embodiment of implementation of the invention will be described hereinafter in connection with the flow chart of FIG. 33 and other attached drawings.

Figure 34:
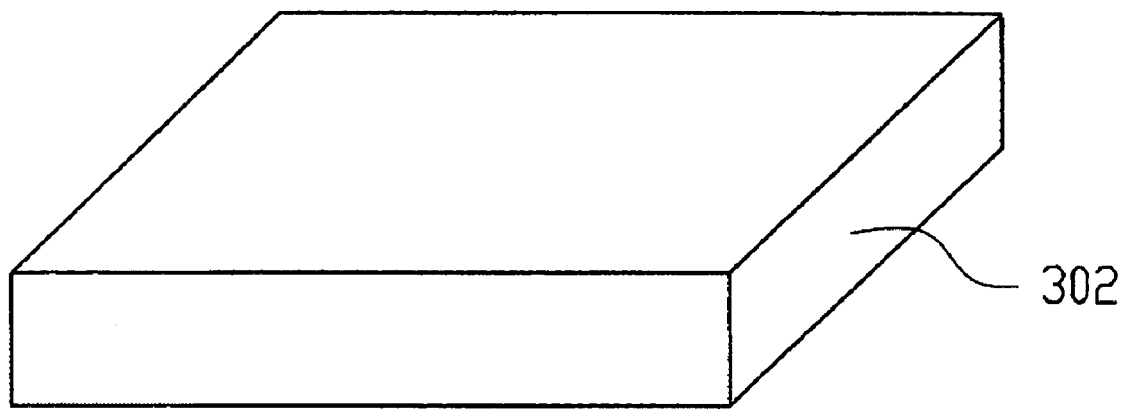
FIG. 34 is a diagram illustrating a process for the formation of a gas flow path according to the fourth embodiment of implementation of the invention.
Figure 34:
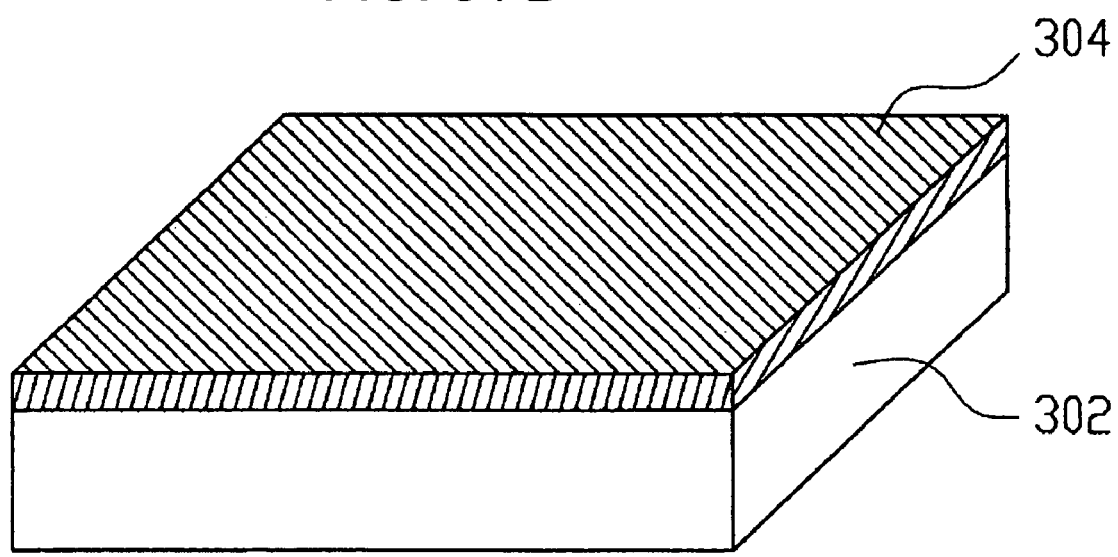

Firstly, a gas flow path for supplying a reactive gas is formed in the substrate (Step S30). That is, a rectangular flat substrate 302 made of, e.g., silicon (first substrate) as shown in FIG. 34(a) is conveyed to the gas flow forming device 314a by the belt conveyor BC31. The surface of the substrate 302 which has been conveyed to the gas flow forming device 314a by the belt conveyor BC31 is then coated with a resin 304, e.g., photo-setting or thermosetting resin (see FIG. 34(b)). Actually, the surface of the substrate 302 is coated with an uncured low viscosity resin 304, e.g., resin 304 having a viscosity of about 20 m·Pas.

Subsequently, a gas flow path forming mold 305 which has been previously prepared is pressed against the resin 304 (see FIG. 35(a)) so that the shape of the gas flow path forming mold 305 is transferred to the resin 304 to form a gas flow path having a predetermined shape. That is, a gas flow path forming mold 305 for forming a gas flow path the width of which gradually decreases from upper portion toward bottom thereof, e.g., gas flow path having a semicircular section which is a curved section as shown in FIG. 35(a) is pressed against the resin 304. The gas flow path forming mold 305 has been previously prepared from quartz glass or the like.

Subsequently, the substrate 302 is irradiated with, for example, a laser beam having a short wavelength from the rear side of the gas flow path forming mold 305 so that the resin 304 is cured to transfer the shape of the gas flow path forming mold 305 to the resin 304. In other words, the resin 304 has a low viscosity, and thus is cured while the gas flow path forming mold 305 is being pressed there against. Subsequently, the gas flow path forming mold 305 is removed from the resin 304 thus cured to form a gas flow path having a semicircular section as shown in FIG. 35(b). The gas flow path forming mold 305 has previously been coated with a release agent so that it can be easily released from the resin 304 thus cured.

The substrate 302 having a gas flow path formed therein the width of which gradually decreases from upper portion toward bottom thereof is transferred from the gas flow path forming device 314a to the belt conveyor BC31 by which it is then conveyed to the ejection device 320a.

Subsequently, a collector layer (first collector layer) for collecting electrons generated by the reaction of the reactive gas is formed on the substrate 302 (Step S31). That is, the substrate 302 which has been conveyed to the ejection device 320a by the belt conveyor BC31 is placed on the table 128 which is then taken into the ejection device 320a. In the ejection device 320a, the material received in the tank 130 for forming a collector layer 306, e.g., electrically-conductive material, such as copper, is ejected onto the substrate 302 placed on the table 128 through the nozzles on the nozzle forming surface 126. During this procedure, the electrically-conductive material is ejected in a pattern such that the diffusion of reactive gas supplied into the gas flow path cannot be prevented, e.g., network pattern to form a collector layer 306.

Figure 36:
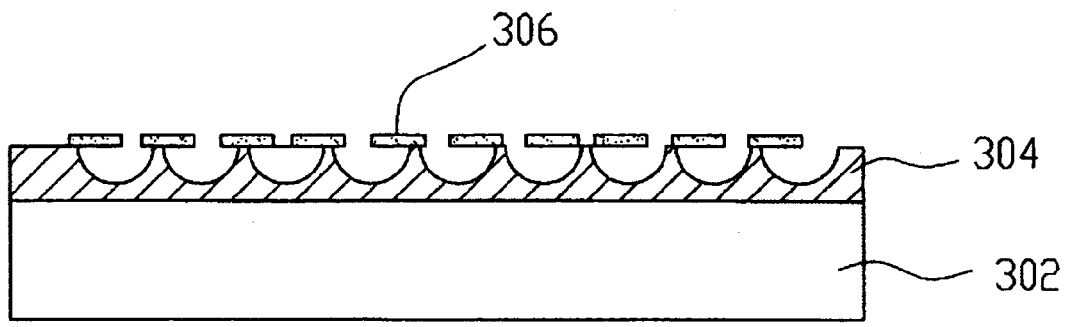
FIG. 36 is an end view of a substrate processed at a process for the production of a fuel cell according to the fourth embodiment of implementation of the invention.

FIG. 36 is an end view of the substrate 302 having a collector layer 306 formed thereon. As shown in FIG. 36, when an electrically-conductive material, such as copper, is ejected in a network pattern, a collector layer 306 is formed. The substrate 302 having a collector layer 306 formed thereon is transferred from the table 128 to the belt conveyor BC31 by which it is then conveyed to the ejection device 320d.

Subsequently, a gas diffusion layer (first gas diffusion layer) for diffusing the reactive gas supplied through the gas flow path formed in the substrate 302 is formed on the collector layer 306 formed at Step S31 (Step S32). That is, the substrate 302 which has been conveyed to the ejection device 320b by the belt conveyor BC31 is placed on the table 128 which is then taken into the ejection device 320d. In the ejection device 320b, the material received in the tank 130 for forming a gas diffusion layer 308, e.g., particulate carbon is ejected onto the collector layer 306 through the nozzles on the nozzle forming surface 126 to form a gas diffusion layer 308 for diffusing the reactive gas (first reactive gas) supplied through the gas flow path.

Figure 37:
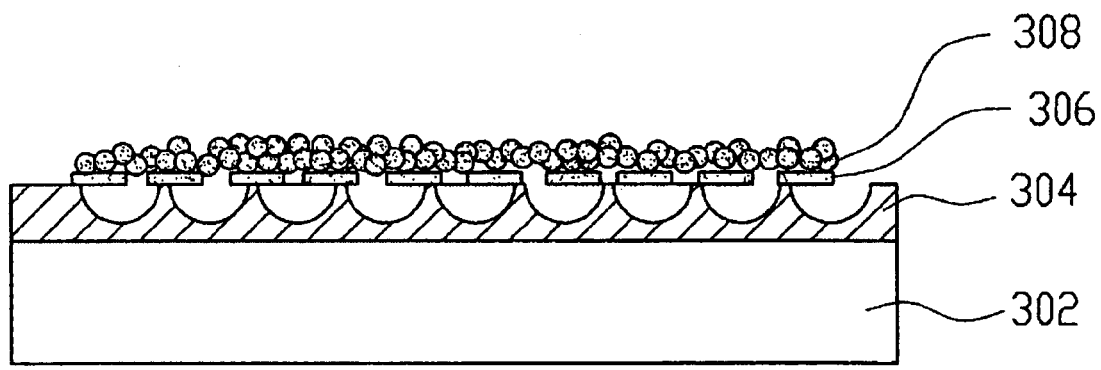
FIG. 37 is an end view of a substrate processed at a process for the production of a fuel cell according to the fourth embodiment of implementation of the invention.

FIG. 37 is an end view of the substrate 302 having a gas diffusion layer 308 formed thereon. As shown in FIG. 37, particulate carbon which also acts as an electrode is ejected onto the collector layer 306 to form a gas diffusion layer 308 for diffusing the reactive gas. As the particulate carbon constituting the gas diffusion layer 308 there is used a porous particulate carbon having a size such that the reactive gas supplied through the gas flow path can be sufficiently diffused. For example, a porous particulate carbon having a diameter of from about 0.1 to 1 μm may be used. The substrate 302 having a gas diffusion layer 308 formed thereon is transferred from the table 128 onto the belt conveyor BC31 by which it is then conveyed to the ejection device 320c.

Subsequently, a reactive layer (first reactive layer) for reacting the reactive gas supplied through the gas flow path formed on the substrate 302 is formed on the gas diffusion layer 308 formed at Step S32 (Step S33). That is, the substrate 302 which has been conveyed to the ejection device 320c by the belt conveyor BC31 is placed on the table 128 which is then taken into the ejection device 320c. In the ejection device 320c, the material received in the tank 130 for forming a reactive layer, e.g., particulate carbon having particulate platinum having a particle diameter of few nanometers to scores of nanometers supported thereon as catalyst (carbon-supported platinum) is ejected onto the gas diffusion layer 308 to form a reactive layer 310. As the carbon supporting the particulate platinum there is used the same particulate carbon as that constituting the gas diffusion layer 308, i.e., porous particulate carbon having the same particle diameter as that of the particulate carbon constituting the gas diffusion layer 308. A dispersion of particulate platinum in a solvent with a dispersant may be spread over the gas diffusion layer 308 the substrate 302 of which is then heated to 200° C. in a nitrogen atmosphere so that the dispersant is removed to form a reactive layer 310. In this case, particulate platinum is attached to the surface of the particulate carbon constituting the gas diffusion layer 308 as a catalyst to form a reactive layer 310.

Figure 38:
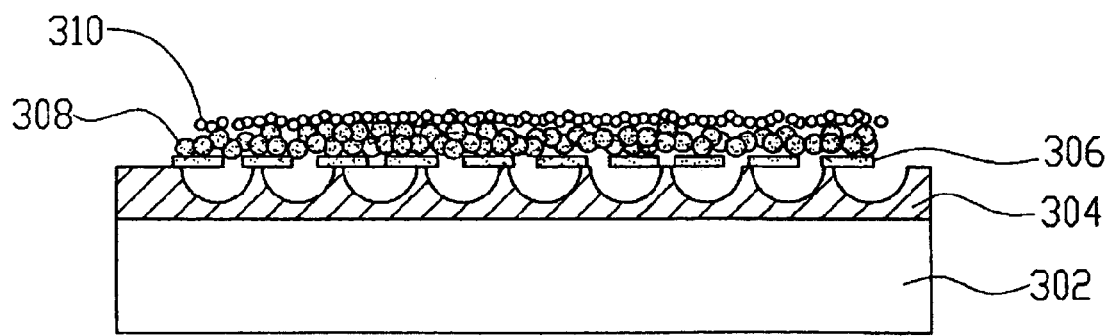
FIG. 38 is an end view of a substrate processed at a process for the production of a fuel cell according to the fourth embodiment of implementation of the invention.

FIG. 38 is an end view of the substrate 302 having a reactive layer 310 formed thereon. As shown in FIG. 38, carbon having particulate platinum supported thereon as a catalyst is spread over the gas diffusion layer 308 to form a reactive layer 310. In FIG. 38, only the particulate platinum is shown as the reactive layer 310 so that the reactive layer 310 and the gas diffusion layer 308 can be easily distinguished from each other. In the following drawings, the reactive layer is shown similarly to FIG. 38. The substrate 302 having a reactive layer 310 formed thereon is transferred from the table 128 to the belt conveyor BC31 by which it is then conveyed to the ejection device 320d.

Subsequently, an electrolyte membrane, such as ion exchange membrane, is formed on the reactive layer 310 formed at Step S33 (Step S34). That is, the substrate 302 which has been conveyed to the ejection device 320d by the belt conveyor BC31 is placed on the table 128 which is then taken into the ejection device 320d. In the ejection device 320d, the material received in the tank 130 for forming an electrolyte membrane, e.g., solution containing perfluorocarbon or sulfonic acid polymer (e.g., Nafion (trade mark)) is ejected onto the reactive layer 310 through the nozzles on the nozzle forming surface 126 to form an electrolyte membrane 312.

Figure 39:
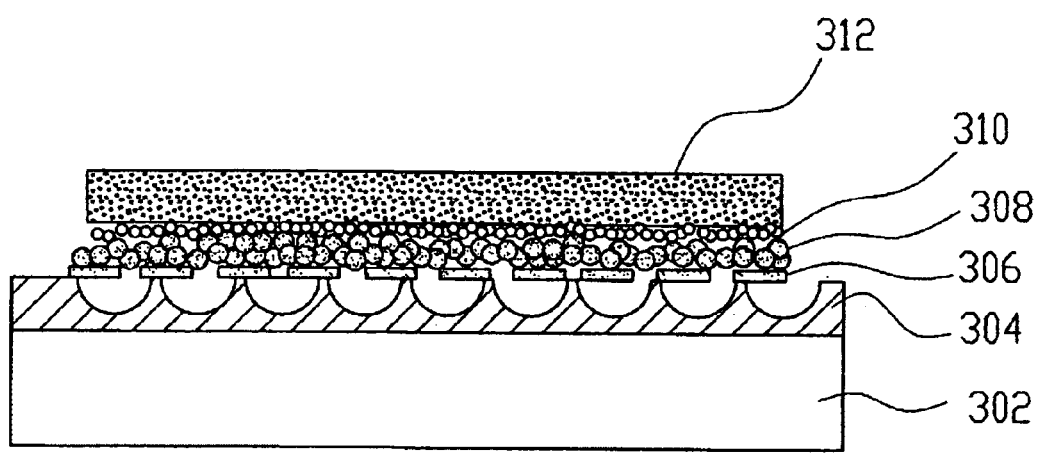
FIG. 39 is an end view of a substrate processed at a process for the production of a fuel cell according to the fourth embodiment of implementation of the invention.

FIG. 39 is an end view of the substrate 302 having an electrolyte membrane 312 formed thereon. As shown in FIG. 39, an electrolyte membrane 312 having a predetermined thickness is formed on the reactive layer 310. The substrate 302 having an electrolyte membrane 312 formed thereon is transferred from the table 128 to the belt conveyor BC31 by which it is then conveyed to the ejection device 320e.

Subsequently, a reactive layer (second reactive layer) is formed on the electrolyte membrane 312 formed at Step S34 (Step S35). That is, the substrate 302 which has been conveyed to the ejection device 320e by the belt conveyor BC31 is placed on the table 128 which is then taken into the ejection device 320e. In the ejection device 320e, carbon having particulate platinum supported thereon as a catalyst is ejected onto the substrate 302 in the same manner as in the ejection device 320c to form a reactive layer 310'.

Figure 40:
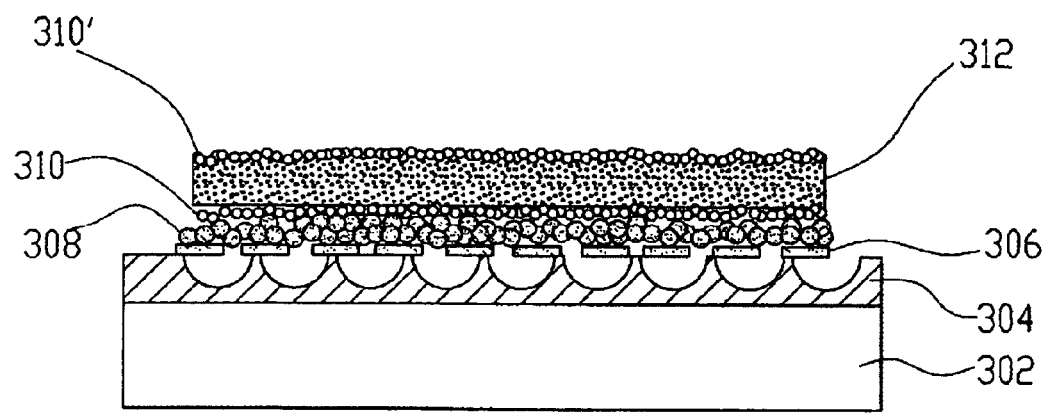
FIG. 40 is an end view of a substrate processed at a process for the production of a fuel cell according to the fourth embodiment of implementation of the invention.

FIG. 40 is an end view of the substrate 302 having a reactive layer 310' formed on the electrolyte membrane 312. As shown in FIG. 40, carbon having particulate platinum supported thereon as a catalyst is spread over the electrolyte membrane 312 to form a reactive layer 310'. The reactive layer 310' is a layer which reacts on the basis of a second reactive gas, such as a reactive gas containing oxygen.

Subsequently, a gas diffusion layer (second gas diffusion layer) for diffusing the reactive gas (second reactive gas) is formed on the reactive layer 310' formed at Step S35 (Step S36). That is, the substrate 302 having a reactive layer 310' formed thereon is conveyed by the belt conveyor BC31 to the ejection device 320f where it is then coated with a porous particulate carbon having a predetermined particle diameter in the same manner as in the ejection device 320b to form a gas diffusion layer 308'.

Figure 41:
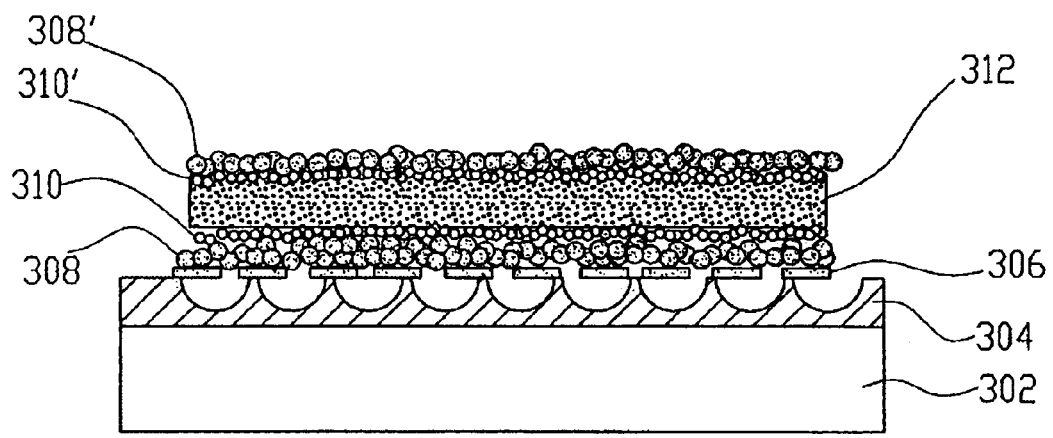
FIG. 41 is an end view of a substrate processed at a process for the production of a fuel cell according to the fourth embodiment of implementation of the invention.

FIG. 41 is an end view of the substrate 302 having a gas diffusion layer 308' formed on the reactive layer 310'. As shown in FIG. 41, a porous particulate carbon is spread over the reactive layer 310' to form a gas diffusion layer 308'.

Subsequently, a collector layer (second collector layer) is formed on the gas diffusion layer 308' formed at Step S36 (Step S37). That is, the substrate 302 which has been conveyed to the ejection device 320g by the belt conveyor BC31 is placed on the table 128 which is then taken into the ejection device 320g where it is then processed in the same manner as in the ejection device 320a to form a collector layer 306' on the gas diffusion layer 308'.

Figure 42:
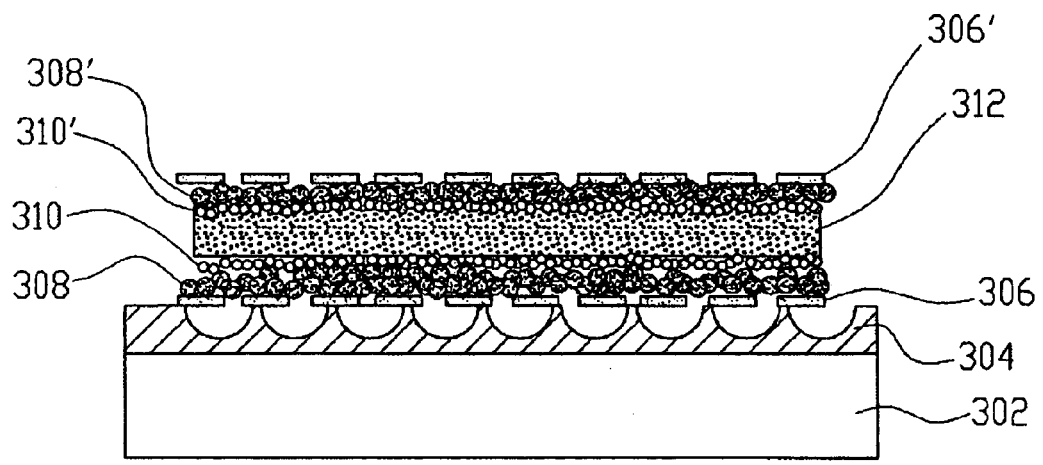
FIG. 42 is an end view of a substrate processed at a process for the production of a fuel cell according to the fourth embodiment of implementation of the invention.

FIG. 42 is an end view of the substrate 302 having a collector layer 306' formed on the gas diffusion layer 308'. As shown in FIG. 42, the substrate 302 is processed according to Step S37 as mentioned above to form a collector layer 306'. The substrate 302 having a collector layer 306' formed thereon is transferred from the table 128 to the belt conveyor BC31 by which it is then conveyed to the assembling device 360.

Subsequently, a substrate having a gas flow path formed therein (second substrate) is provided on the substrate (first substrate) on which a collector layer has been formed at Step S37 to assemble a fuel cell (Step S38). That is, in the assembling device 360, the substrate 302' (second substrate) which has been conveyed by the belt conveyor BC32 is disposed on the substrate 302 (first substrate) which has been conveyed by the belt conveyor BC31 to assemble a fuel cell. The substrate 302' has a second gas flow path formed therein which is different from those formed according to processing at Steps S30 to S37 mentioned above. In other words, in the ejection device 314b, a second gas flow path is formed in the same manner as in the ejection device 314a. Accordingly, the substrate 302' is disposed on the substrate 302 in such an arrangement that the gas flow path having a semicircular section extending from one side to the other side of the substrate 302 is parallel to the gas flow path having a semicircular section formed on the substrate 302' to assemble a fuel cell. Thus, the production of a fuel cell is completed.

Figure 43:
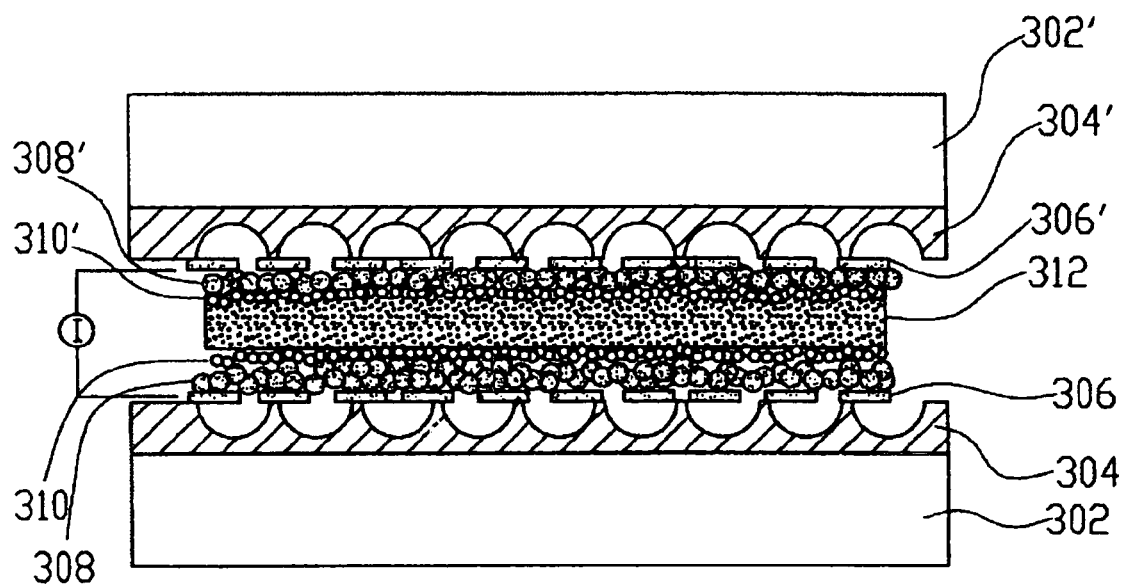
FIG. 43 is an end view of a fuel cell according to the fourth embodiment of implementation of the invention.
Figure 44:
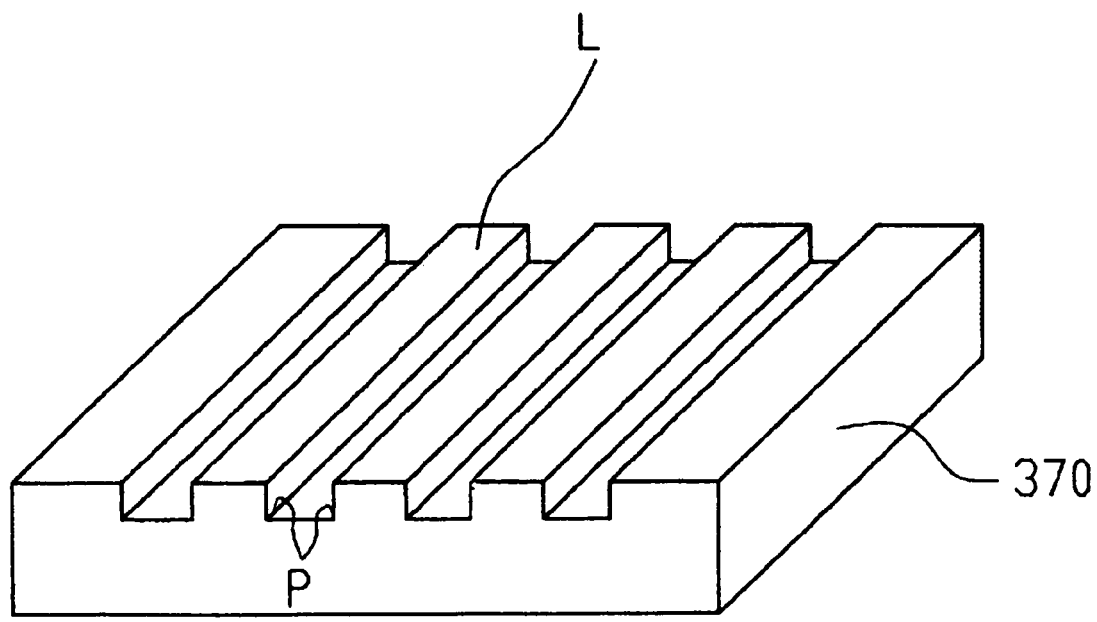
FIG. 44 is a diagram illustrating a prior art gas flow path.

FIG. 43 is an end view of the fuel cell thus completed. As shown in FIG. 43, the substrate 302' having a second gas flow path formed therein is disposed on the substrate 302 at a predetermined position to complete the production of a fuel cell which supplies a first reactive gas and a second reactive gas through a first gas flow path and a second gas flow path formed on a first substrate and a second substrate, respectively. While the fourth embodiment of implementation of the invention involves the disposition of the substrate 302' such that the first gas flow path and the second gas flow path are parallel to each other, the substrate 302' may also be disposed in such an arrangement that the first gas flow path and the second gas flow path cross each other as in the third embodiment of implementation of the invention.

The fuel cell produced by the production process according to the aforementioned fourth embodiment of implementation of the invention can be incorporated as a power supply source in electronic devices, particularly portable electronic devices such as cellular phone. In other words, in accordance with the aforementioned process for the production of a fuel cell, the flow path resistance can be reduced, making it easy to produce a small-sized fuel cell having an enhanced electricity-generating efficiency. The fuel cell thus produced can be incorporated as a power supply source in small-sized electronic devices such as cellular phone.

The fuel cell according to the fourth embodiment of implementation of the invention has a gas flow path having a semicircular section formed therein the width of which gradually decreases from upper portion toward bottom thereof. In this arrangement, stress developed by the pressure of reactive gas is not concentrated onto specific portions as in the gas flow path having a U-shaped section but is dispersed in the gas flow path, making it possible to effectively prevent the gas flow path from being damaged by the break of the wall of the gas flow path, and the like. Thus, the distance between the gas flow paths can be reduced, making it possible to efficiently supply the reactive gas into the fuel cell and hence raise the reaction efficiency of the fuel cell. Further, since the area of the inner wall of the gas flow path in contact with the reactive gas is smaller than in the gas flow path having a U-shaped section, the flow path resistance can be reduced to reduce the pressure loss of reactive gas.

The process for the production of a fuel cell according to the aforementioned fourth embodiment of implementation of the invention comprises pressing a previously formed gas flow path forming mold against a resin spread over the substrate to form a gas flow path having a desired shape. Accordingly, the previous formation of a gas flow path forming mold having, e.g., a semicircular section the width of which gradually decreases from upper portion toward bottom thereof makes it easy to form a gas flow path having a desired shape. Further, since a gas flow path is formed using a previously formed gas flow path forming mold, a large number of gas flow paths having a desired shape can be formed rapidly, making it possible to enhance the efficiency of production of fuel cell.

While the fuel cell according to the aforementioned fourth embodiment of implementation of the invention has a gas flow path having a semicircular section formed therein, the gas flow path may have any sectional shape, e.g., inverted triangle, semiellipsoid or stepped inner wall so far as the width of the gas flow path gradually decreases from upper portion toward bottom thereof.

While the process for the production of a fuel cell according to the aforementioned fourth embodiment of implementation of the invention involves the formation of a gas flow path using a gas flow path forming mold, the gas flow path may be formed without using any gas flow path forming mold. For example, in order to form a gas flow path having a semicircular section, isotropic wet etching may be effected.

While the process for the production of a fuel cell according to the aforementioned fourth embodiment of implementation of the invention involves the formation of a gas flow path by a low viscosity resin, a high viscosity resin may be used to form a gas flow path. In this case, the gas flow path can be formed by pressing a gas flow path forming mold against the resin, removing the gas flow path forming mold from the resin, and then irradiating with the resin with laser beam having a short wavelength or otherwise processing the resin so that the resin is cured.

While the process for the production of a fuel cell according to the aforementioned fourth embodiment of implementation of the invention involves the formation of a gas flow path using a gas flow path forming mold, the gas flow path may be formed using an ejection device. For example, the size of the droplet of an etching solution to be spread over the surface of the substrate may be gradually reduced to form a gas flow path the width of which gradually decreases from upper portion toward bottom thereof, i.e., gas flow path the inner wall of which is stepped.

Alternatively, the substrate which has been coated with a resin using an ejection device may be irradiated with light or otherwise processed under pressure of a previously formed gas flow path forming mold in a gas flow path forming device to form a gas flow path. In this case, the density of the resin to be spread over the substrate using the ejection device may be low at the area where the gas flow path is formed but high at the area where the wall of the gas flow path is formed to prevent the resin from being spread over unnecessary areas, making it possible to save the resin to be used in the formation of the gas flow path.

While the process for the production of a fuel cell according to the aforementioned fourth embodiment of implementation of the invention involves the formation of all the gas flow paths to be formed on the substrate at once, these gas flow paths may be batchwise formed. In other words, a plurality of gas flow paths to be formed on the substrate may be batchwise formed using a small-sized gas flow path forming mold. In this case, the gas flow path forming mold is small-sized, making it assured that the pressure against the gas flow path forming mold can be uniformalized and hence making it possible to form a gas flow path having a desired shape with a high precision. Further, the use of a small-sized gas flow path forming mold makes it possible to reduce the size of the gas flow path forming device itself and hence build a fuel cell production line in a reduced space at a reduced cost.

While the process for the production of a fuel cell according to the aforementioned fourth embodiment of implementation of the invention involves the production of a small-sized fuel cell, a plurality of fuel cells may be stacked to produce a large-sized fuel cell. In other words, as shown in FIG. 31, the substrate 302' of the fuel cell thus produced may further have gas flow paths formed on the back surface thereof and a gas diffusion layer, a reactive layer, an electrolyte membrane and other layers formed on the back surface thereof in the same manner as in the aforementioned process for the production of a fuel cell. A plurality of these fuel cells may then be stacked to produce a large-sized fuel cell. The large-sized fuel cell thus produced can be used as a power supply source for electric car to provide a clean-energy automobile designed taking global atmosphere in proper account.

In accordance with the fuel cell according to the invention, the opening width of at least one of the first gas flow path and the second gas flow path is smaller than the particle diameter of the material constituting the first gas diffusion layer and the second gas diffusion layer. In other words, the opening width of the gas flow path is smaller than the particle diameter of the porous particulate carbon constituting the gas diffusion layer, making it assured that the entrance of the porous particulate material into the gas flow path can be prevented to inhibit the clogging of the gas flow path.

In accordance with the process for the production of a fuel cell according to the invention, at least one of the first gas flow path forming step and the second gas flow path forming step includes forming a gas flow path the opening width of which is smaller than the particle diameter of the material constituting the first gas diffusion layer and the second gas diffusion layer using an ejection device. In this manner, a fuel cell can be easily produced at a reduced cost which can prevent the material constituting the gas diffusion layer, such as porous particulate carbon, from entering in the gas flow path.

In accordance with the fuel cell according to the invention, the width of at least one of the first gas flow path and the second gas flow path gradually increases from upstream toward downstream. In this arrangement, the amount of reactive gas supplied into the reactive layer through the gas flow path can be kept uniform from upstream to downstream on the gas flow path.

In accordance with the process for the production of a fuel cell according to the invention, at least one of the first gas flow path forming step and the second gas flow path forming step involves the formation of a gas flow path the width of which gradually increases from upstream toward downstream. In this manner, the amount of reactive gas supplied into the reactive layer through the gas flow path can be kept uniform from upstream to downstream on the gas flow path and a fuel cell having a high electricity generation efficiency can be produced.

In accordance with the fuel cell according to the invention, the width of at least one of the first gas flow path and the second gas flow path gradually decreases from upper portion toward bottom of the first gas flow path or second gas flow path. In this arrangement, unlike the fuel cell comprising a gas flow path having a U-shaped section, this fuel cell comprises a gas flow path formed therein which can properly prevent the concentration of stress developed by the pressure of first or second reactive gas onto a specific site resulting in damage of the gas flow path. Further, since the area of the inner wall of the gas flow path in contact with the reactive gas is smaller than in the gas flow path having a U-shaped section, the gas flow path resistance can be reduced to reduce the pressure loss of reactive gas.

In accordance with the process for the production of a fuel cell according to the invention, at least one of the first gas flow path forming step and the second gas flow path forming step involves the formation of a first gas flow path or second gas flow path the width of which gradually decreases from upper portion toward bottom thereof. In this manner, a fuel cell can be formed which can properly prevent the concentration of stress developed by the pressure of reactive gas onto specific sites in the gas flow path resulting in damage of the gas flow path.

Further, the use of a gas flow path forming mold makes it possible to easily and rapidly form a gas flow path having a desired shape.

Thus, while this invention has been described in conjunction with specific embodiments thereof, it is evident that many alternatives, modifications, and variations will be apparent to those, skilled in the art. Accordingly, preferred embodiments of the invention as set forth herein are intended to be illustrative, not limiting. Various changes may be made without departing from the spirit and scope of the invention.

What is claimed is:

1. A fuel cell, comprising:
    a first substrate having a first gas flow path formed therein that supplies a first reactive gas, the first gas flow path having a trapezoidal shape;
    a first collector layer formed on the first substrate side thereof;
    a first gas diffusion layer formed on the first substrate side thereof;
    a first reactive layer formed on the first substrate side thereof;
    a second substrate having a second gas flow path formed therein that supplies a second reactive gas;
    a second collector layer formed on the second substrate side thereof;
    a second gas diffusion layer formed on the second substrate side thereof;
    a second reactive layer formed on the second substrate side thereof; and
    an electrolyte membrane formed interposed between the first reactive layer and the second reactive layer, a width of an opening of at least one of the first gas flow path and the second gas flow path being smaller than a particle diameter of material constituting the first gas diffusion layer and the second gas diffusion layer.

2. The fuel cell as defined in claim 1, a width of a bottom of the first gas flow path being greater than the width of the opening thereof, and a width of a bottom of the second gas flow path being greater than the width of the opening thereof.

3. The fuel cell as defined in claim 1, the second gas flow path having a trapezoidal shape.

* * * * *

UNITED STATES PATENT AND TRADEMARK OFFICE
CERTIFICATE OF CORRECTION

PATENT NO.          : 7,390,588 B2
APPLICATION NO.  : 10/780737
DATED                  : June 24, 2008
INVENTOR(S)         : Shuhei Yamada, Hirotsuna Miura and Yasunori Yamazaki It is certified that error appears in the above-identified patent and that said Letters Patent is hereby corrected as shown below:

On the Title Page
Please delete the following:

Item (75)   Inventors:   Shuhei Yamada, Chino (JP); Hirotsuna Mirua, Fujimi-machi (JP); Yasunori Yamazaki, Shimosuwa-machi (JP); Yoshiharu Ajiki, Fujimi-cho (JP)

and Replace with:

Item (75)   Inventors:   Shuhei Yamada, Chino (JP); Hirotsuna Mirua, Fujimi-machi (JP); Yasunori Yamazaki, Shimosuwa-machi (JP)

Signed and Sealed this

Second Day of September, 2008

JON W. DUDAS
*Director of the United States Patent and Trademark Office*